United States Patent

[11] 3,602,702

[72] Inventor John E. Warnock
Salt Lake City, Utah

[21] Appl. No. 825,904
[22] Filed May 19, 1969
[45] Patented Aug. 31, 1971

[73] Assignee The University of Utah
Salt Lake City, Utah

[54] ELECTRONICALLY GENERATED PERSPECTIVE IMAGES
51 Claims, 40 Drawing Figs.

[52] U.S. Cl. .......... 235/151, 340/172.5, 340/324 A
[51] Int. Cl. .......... G06f 15/20, G06g 7/48
[50] Field of Search .......... 235/151, 151 PL; 340/324.1, 172.5; 33/18 C

[56] References Cited

UNITED STATES PATENTS

| | | | |
|---|---|---|---|
| 3,145,474 | 8/1964 | Taylor, Jr. | 235/151 X |
| 3,364,382 | 1/1968 | Harrison | 340/324.1 X |
| 3,422,537 | 1/1969 | Dewey et al. | 235/151 UX |
| 3,441,789 | 4/1969 | Harrison | 340/324.1 X |
| 3,449,721 | 6/1969 | Dertouzos et al. | 340/324.1 X |
| 3,480,943 | 11/1969 | Manber | 340/324.1 |
| 3,519,997 | 7/1970 | Bernhart et al. | 340/172.5 |

OTHER REFERENCES

"Computer Method for Perspective Drawing," By Puckett, Journal of Spacecraft and Rocket, 1964, pp. 44–48.

"A Solution to the Hidden-Line Problem for Computer-Drawn Polyhedra," Loutrel, 9-19-67, (New York Univ., by NASA).

"The Notion of Quantitative Visibility and Machine Rendering of Solids," Arthur Appel, Proceedings ACM, 1967, pp. 387–393.

"An Algorithm for Hidden Line Elimination," Galimberti and Montanari, January 1968, (Elettrotecnica ed Elettronica).

*Primary Examiner*—Eugene G. Botz
*Assistant Examiner*—Jerry Smith
*Attorney*—Lynn G. Foster

ABSTRACT: A method and system for electronically generating and displaying shaded two-dimensional perspective images of three-dimensional objects in which sharp resolutions of intersections of the objects is maintained, by providing electrical signals representative of surfaces of the objects and determining the spatial relationship between these surfaces and progressively smaller portions of a two-dimensional view plane or the viewing screen of the display. These spatial relationships are then utilized to determine the surfaces to be displayed within each of the ultimate portions of the view plane or viewing screen.

INVENTOR.
John E. Warnock

INVENTOR.
JOHN E. WARNOCK

BY Lynn G. Foster
ATTORNEY

INVENTOR.
JOHN E. WARNOCK
BY Lynn G. Foster
ATTORNEY

INVENTOR.
JOHN E. WARNOCK
BY Lynn H. Foster
ATTORNEY

INVENTOR.
JOHN E. WARNOCK

BY Lynn G. Foster
ATTORNEY

INVENTOR.
JOHN E. WARNOCK
BY Lynn G. Foster
ATTORNEY

INVENTOR.
JOHN E. WARNOCK

BY [signature]
ATTORNEY

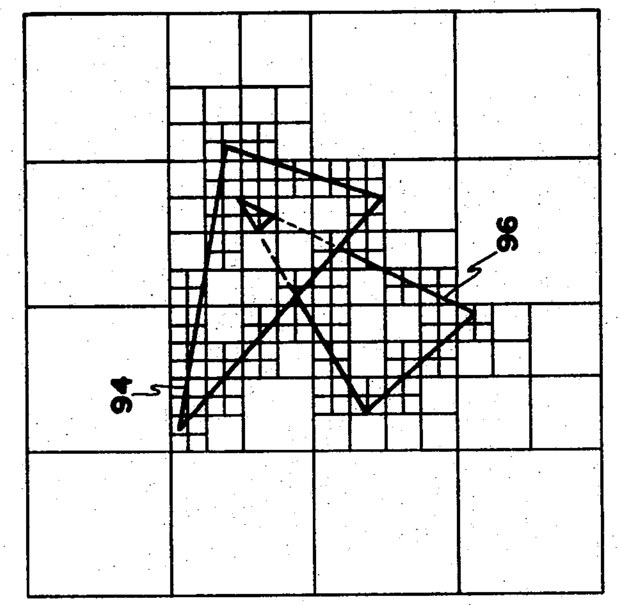
FIG. 10m
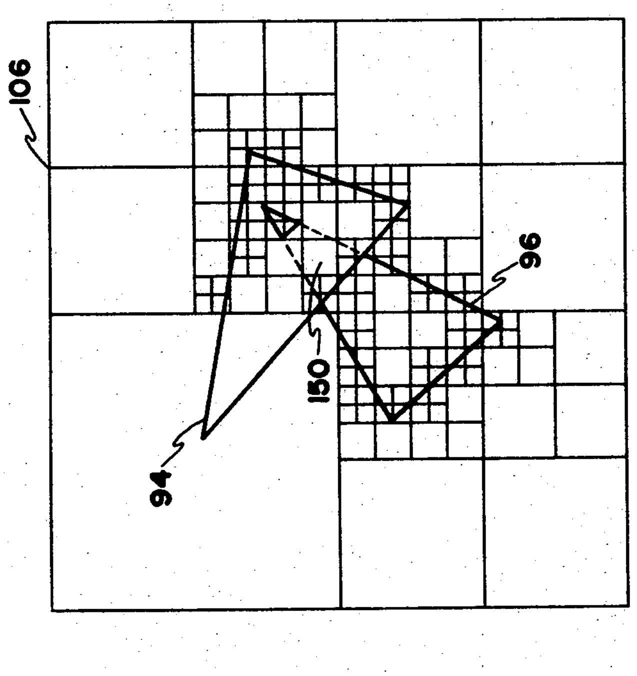
FIG. 10 "el"
INVENTOR.
JOHN E. WARNOCK
BY Lynn S. Foster
ATTORNEY

INVENTOR.
JOHN E. WARNOCK

BY Lynn S. Foster

ATTORNEY

INVENTOR.
JOHN E. WARNOCK
BY Lynn S. Foster
ATTORNEY

INVENTOR.
JOHN E. WARNOCK
BY Lynn G. Foster
ATTORNEY

INVENTOR.
JOHN E. WARNOCK
BY Lynn G. Foster
ATTORNEY

INVENTOR.
JOHN E. WARNOCK
BY Lynn G. Foster
ATTORNEY

INVENTOR.
JOHN E. WARNOCK
BY [signature]
ATTORNEY

INVENTOR.
JOHN E. WARNOCK
BY Lynn S. Foster
ATTORNEY

ELECTRONICALLY GENERATED PERSPECTIVE IMAGES

FIELD OF THE INVENTION

This invention relates to a method and system for generating perspective images of three-dimensional (3-D) objects and more particularly to an electronic method and system for generating shaded perspective images of complex 3-D objects on a raster scan display while maintaining sharp resolution of any intersection of the objects being displayed. This invention further provides for the elimination of hidden lines of the objects and shading of visible surfaces, through finite techniques which dramatically reduce the required computations and which allow needed surface information to be interpolated from a relatively few surface locations where finite solutions are first obtained.

BACKGROUND

Perspective views of 3-D objects communicate to the viewer the actual physical arrangement and dimensionality of the objects as well as the relative positions and intersections thereof. Such views are generally employed in areas of design work such as architecture, machine design, product design, and other phases of engineering design. This communication is enhanced greatly by eliminating hidden surfaces, shading the visible part of the perspective view to display the image as it would be seen from a source of illumination and maintaining sharp resolution of any intersections between the objects being displayed.

Hidden surfaces consist of the portions of objects which are concealed from the sight of an observer by the parts of the objects which are visible in a particular orientation of the objects. The inclusion of hidden surfaces in a perspective view tends to confuse the viewer, because ambiguities are created. This confusion increases greatly with increasing object complexity, substantially eroding the usefulness of the perspective view.

Shading enhances the realism of the perspective view by adding the appearance of depth to the two-dimensional representation. This appearance of depth greatly improves the ease with which the display can be comprehended by the technically trained as well as the novice.

The maintenance of sharp resolution of intersections between objects is necessary to generate accurate and high quality perspective images of complex arrangements of objects. Intersections of objects which pierce other objects depict to the viewer the relative depths and positioning of the objects displayed. Thus, enhancing the understanding of such intersections, and the quality of the display, adds to the viewer's comprehension of the display.

Such perspective views are usually manually prepared by a skilled draftsman. As such, they require a large expenditure of time and the correctness of the view depends on the skill of the draftsman. Furthermore, as the complexity of the object increases more drafting skill is required to prepare the view and the expenditure of drafting time increases at a rate faster than the increase in object complexity.

Various attempts have been made to reduce the expenditure of time and skill required to construct perspective views. Such attempts have included drafting machines which produce simple line drawing perspectives; relay calculators which project the three-dimensional object onto a two-dimensional coordinate system on a point by point basis; and various digital techniques which have utilized point by point production, constructing the object from basic geometric models and line by line construction of the object. All of these attempts, however, have produced only simple line drawings including hidden lines and do not include shading or sharp resolution of visible intersections between objects. Various attempts have been made to eliminate hidden lines, however the computational times, especially for complex objects, is so great as to render these approaches impractical.

One solution to problems of generating perspective images in which hidden surfaces are eliminated and the displayed image is shaded has been developed and is disclosed in U.S. pending application Ser. No. 802,702, filed Nov. 13, 1968, by Romney et al. The Romney at al. method and system generates such perspective images by quantizing input data representing the objects into units defining the surfaces of the object which are then converted to correspond to their projections on a viewplane established according to the desired orientation of the object. These units of data are sorted into the order in which the surfaces appear along each scan line of a raster scan display, and checked to determine the visible surfaces which are displayed by modifying the intensity of the display in accordance with a determined visual characteristic of each visible surface in the order established.

SUMMARY AND OBJECTS OF THE PRESENT INVENTION

While the present invention may utilize many of the specific components of the prior Romney et al. system, it is based on a conceptually different approach.

The present invention offers important advantages over the prior Romney et al. system. In the Romney et al. system, intersections of objects were approximated by edges of the surfaces defined by the units in the quantizing part of the system. In the present invention such an approximation is not required, and intersections are more accurately generated while maintaining better resolution. In addition, a significant reduction in the required computation time is achieved by the present invention especially with respect to increasingly complex and interrelated objects. In the present invention the computational time increases at a lesser rate for increasingly complex objects than the prior Romney et al. system.

These features are accomplished by a novel method and system in which the spatial relationships of surfaces of the objects to be displayed with respect to progressively smaller subdivisions of a viewplane or a viewing screen of the display are determined and then utilized to determine the surface which is visible within each subdivision. The perspective image may then be displayed by modifying the intensity of the display in accordance with visual characteristics of the surfaces within each subdivision.

Therefore, it is an object of this invention to provide a novel method and system for generating perspective images of three-dimensional objects.

It is another object of this invention to provide a novel method and system for generating perspective images of three dimensional objects in which the computation time is substantially reduced.

It is still another object of the present invention to provide a novel method and system for generating perspective images of three-dimensional objects in which the computation time increases at a lesser rate than previously known systems for increasingly complex objects.

It is a further object of the present invention to provide a novel method and system for generating perspective images in which hidden surfaces are eliminated.

It is still a further object of the present invention to provide a novel method and system for generating a perspective image which is shaded to enhance depth perception and the realism of the generated image.

It is another object of the present invention to provide a novel method and system for generating perspective images in which intersections between complex objects are maintained in sharp resolution in the generated image.

These and other objects and advantages of the present invention will be readily apparent to one skilled in the art to which the invention pertains from a perusal of the claims and the following detailed description when read in conjunction with the appended drawings in which:

BRIEF DESCRIPTION OF THE FIGURES

FIGS. 10*a–m* are a series of diagrammatic illustrations of the operation of an embodiment of the subdivision process utilized in the present invention;

DETAILED DESCRIPTION

Results

The present invention is capable of generating two-dimensional shaded perspective images of complex three-dimensional objects and combinations thereof including intersecting objects as illustrated in FIGS. 1*a*–1*d*. These illustrations are lithographic reproductions of actual images which have been generated by a system embodying the novel concepts of the present invention. The various objects and intersecting combinations thereof are indicative of the scope of capabilities of the present invention and its wide range of applications. As can be seen from these figures, hidden surfaces are eliminated and the objects are appropriately shaded to significantly increase the realism and depth perception of the perspective views. In addition, intersections between the objects are clearly defined with sharp resolution. The elimination of the hidden surfaces, the shading and the sharp resolution of the intersection communicates to the viewer an accurate understanding of the spatial relationship between the objects in the particular orientation from which the objects are viewed.

Figure 1A:
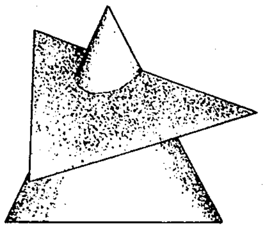
FIGS. 1*a–e* are reproductions of actual perspective images of threedimensional objects generated by a system embodying the present invention.

FIG. 1*a* is a perspective reproduction of a cone which pierces through a triangular plane. The base portion of the cone clearly shows the effect of shading as the center portion which is closest to a theoretical observer is lightest, and the cone darkens as the surface curves away toward the rear. The triangular plane which intersects the cone also appears lightest at its lower edge which is the portion which is closest to the observer and darkens toward the upper vertex. In addition, the intersection of the triangular plane with the cone is clearly defined and the portions of the cone which are behind the plane are not displayed.

Figure 1B:
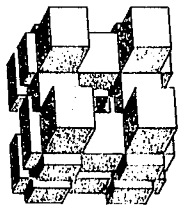

FIG. 1*b* is a perspective reproduction of a geometrical structure which is essentially a combination of 12 identical blocks. The object is displayed as being viewed with the object rotated slightly upwards and the left side rotated slightly outward, thus moving the lower left corner closer to the observer and displaying the bottom face of the object. This orientation is clear from the relative shading of the surfaces in which the face of the extending cube in the lower left-hand corner appears the lightest and the face of the extending cube in the upper right-hand corner appears the darkest of the extending cubes on the face of the object. The reproduction also is another illustration of the clearly defined intersections between the various cubes.

Figure 1C:
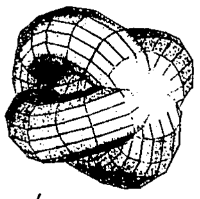
Figure 1D:
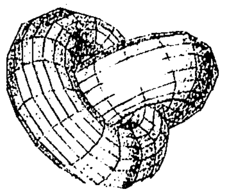

FIGS. 1*c* and 1*d* are perspective reproductions which illustrate two different intersecting relationships between two toroidal-shaped objects. FIG. 1*c* illustrates the bodies of the toroidal objects intersecting each other with the axes of the toroids perpendicular to each other. The reproduction clearly illustrates the curved intersection between the two curved bodies. FIG. 1*d* illustrates the toroidal objects in an interlocking arrangement in which the bodies of each pass through the aperture of the other. The portions of each toroid which are behind another are not shown, which accurately reconstruct the spatial relationship between the objects. In both figures the apparent rings both along the surface of the body and axially around it are due to the type of surface defined by the electrical input data and the resolution of the display.

Figure 1E:

FIG. 1*e* is a perspective reproduction of a free-form object which is essentially a sheet having a complex combination of curves and bends in diverse directions. This reproduction illustrates the capability of the present invention in generating perspective images of highly complex objects and the effect of shading for communicating to the observer the orientation of the object. In the particular view, by virtue of shading, it can be seen that the upper right-hand portion is closest to the view since this is the lightest portion and that the theoretical observer is actually looking up underneath the sheet.

Theory

Conceptually, the present invention generates shaded perspective images with hidden surfaces removed and intersections of the objects maintained in sharp resolution by taking the rather formidable problem of deciding what surfaces of the object or objects are to be displayed and subdividing this problem into a plurality of simpler ones. Basically, the input data describes all of the surfaces of the object or objects under consideration. This data is then looked at with respect to progressively smaller portions of the visible field of view to determine which of the many surfaces possibly located along the line of sight of an observer would be visible in the particular orientation of the objects desired.

The input data necessary for the present invention defines all of the surfaces of the object or objects in terms of a three-dimensional coordinate system referenced in accordance with the desired orientation of the objects. The input data may be supplied with reference to an absolute coordinate system in which case it must first be transformed, translated and/or rotated to the desired orientation, coordinate system and to exhibit the desired characteristics for realistic two-dimensional perspective display.

Depending on the objects to be displayed and the types of surfaces chosen, the input data may take one of several forms. If curved surfaces are to be displayed, they may be defined by a set of parametric equations with a bounding polygon. If planar polygons are utilized a closed loop of vertex points for each polygon may be utilized. For simplicity of explanation only input data representative of planar polygons will be described herein.

Figures 2, 3, 4, 5:
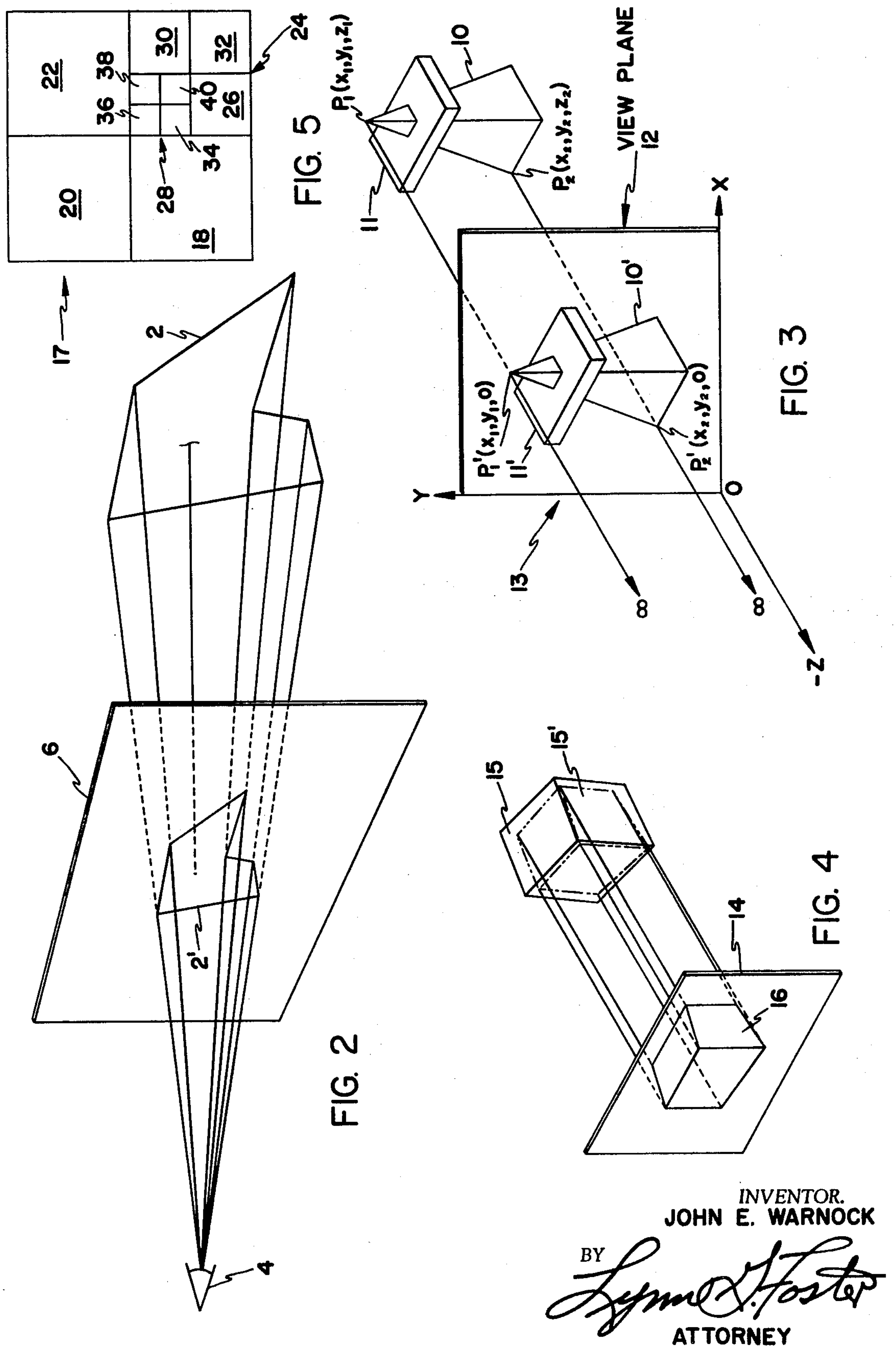
FIGS. 2, 3 and 4 are diagrammatic illustrations of projection techniques which can be utilized in the present invention.
FIG. 5 is a diagrammatic illustration of one embodiment of the subdivision process utilized in the present invention.

Since all that an observer actually sees is a two-dimensional image the input data is first converted to represent the projection thereof on a two-dimensional view plane. This projection is graphically illustrated in FIG. 2. In FIG. 2, a polygon 2 is being viewed from an eyepoint 4. The two-dimensional image of the polygon 2, as seen from the eyepoint 4, is a polygon 2' on a two-dimensional view plane 6.

Various types of projections can be used depending on the type of perspective view desired. One very simple projection technique is graphically illustrated in FIG. 3, in which two intersecting three-dimensional objects, a pyramid 10 and a rectangular solid 11, are projected to form the two-dimensional images thereof, namely a pyramid 10' and a rectangular solid 11', on a view plane 12. The view plane 12 constitutes the image plane of the objects as viewed by an observer. When the perspective image is to be displayed on an electronic display, the view plane 12 corresponds to the viewing screen of the display since the image as viewed by an observer is reconstructed on the display screen.

For simplicity the objects are described in terms of a chosen orthogonal coordinate system 13, the axes of which are labeled X, Y and Z. The apex of the pyramid is a point $P_1$ which is defined by its coordinates in the coordinate system 13 as $x_1$, $y_1$ and $z_1$. A second point $P_2$ at the base of the pyramid 10 is defined by its coordinates $x_2$, $y_2$ and $z_2$. The particular projection illustrated constitutes an orthogonal projection in which the observer is positioned at a point the X- and Y-coordinates of which are the centroid of the view plane 12 and the Z coordinate of which equals infinity. For simplicity, the view plane 12 is chosen to lie in a plane formed by the X- and Y-axes of the chosen coordinate system 13. These conditions greatly simplify the projection since all of the points of the objects to be displayed will project to the view plane 12 with their X- and Y-coordinates remaining the same and their Z-coordinates equal to zero. For example, the point $P_1$ projects to a point $P'_1$ on the view plane 12 whose coordinates are $x_1$, $y_1$ and zero. The point $P_2$ projects to a point $P'_2$ whose coordinates are $x_2$, $y_2$ and zero.

This relatively simple projection technique allows the original data when properly translated and rotated to be used directly, if an orthogonal perspective view is desired. If a nonorthogonal perspective view is desired to be displayed this simple projection technique may still be used with the additional requirement that the input data is first appropriately transformed. Theoretically, the transformation of the input imposes the reduction in size for more distant surfaces on the object itself rather than in the projection step.

As shown in FIG. 4, a nonorthogonal two-dimensional perspective can be obtained at view plane 14 by first transforming the three-space object 15 to the three-space object 15'. Mathematically, this transformation is accomplished by determining for all points new values according to the following equations:

$$x_{new}=\frac{x_{old}}{tz+1} \qquad (1)$$

$$y_{new}=\frac{y_{old}}{tz+1} \qquad (2)$$

and $$z_{new}=\frac{z_{old}}{tz+1} \qquad (3)$$

where $x_{new}$, $y_{new}$ and $z_{new}$ are the transformed coordinates, $z$ is the value at any particular point along the $z$-axis where the $x_{new}$, $y_{new}$ and $z_{new}$ are being calculated. $x_{old}$, $y_{old}$ and $z_{old}$ were the given input coordinates and $t$ is a transformation constant less than 1.

The transformed vertex points are orthogonally projected to the view plane to provide the nonorthogonal two-dimensional image 16. Thus, the $x$ and $y$ coordinates of the transformed three-dimensional object 15' become the $x$- and $y$-coordinates of the two-dimensional image 16.

Other projections may be utilized as well. For example, the nonorthogonal projection technique described in the Romney at al. application cited above may be utilized to convert the input data for nonorthogonal perspectives.

A plane or polygon in a three-dimensional coordinate system may be described by the equation:

$$Z=aX+bY+c \qquad (4)$$

where $a$, $b$ and $c$ are constant coefficients of the plane.

Once converted, the input data may then be utilized to determine these coefficients for each of the polygons by solving equation (4) for at least three vertex points of the polygon. This determination may be made by utilizing any of the well-known rules for solving simultaneous equations, such as Cramer's Rule. The coefficients $a$, $b$ and $c$ are utilized in subsequent operations to determine which surfaces are visible within the particular portion being looked at, and to derive intensity interpolation parameters for providing the appropriate shading of the objects.

Once the input data is in the form required and the desired coefficients have been calculated, the determination of which surfaces are to be displayed may begin. As mentioned previously, the procedure for determining which surfaces are to be displayed is to divide the problem into a large number of simpler problems. This is accomplished by looking at progressively smaller subdivisions of the view plane or viewing screen of the display on which the objects are projected until the visible surface within each subdivision may be easily determined.

The particular mode of subdividing and the actual subdivisions chosen may take many forms. These may include for example, subdividing the view plane into a number of subsquares and then if necessary, subdividing each of the subsquares in the same manner. Alternatively, where a raster scan display is utilized, the view plane or display screen may be subdivided into portions corresponding to the scan lines of the display, which portions are further subdivided as required.

The subsquare mode will be described in detail herein. FIrst the screen of the display which, for convenience, is chosen to be dimensionally a square is subdivided into four subsquares. Each subsquare is then checked to determine whether or not the portion of the objects which project to that subsquare are simple enough for the determination to be made. If not, the particular subsquare is further subdivided into four smaller equal subsquares which are checked in the same manner as the first set of subsquares. This procedure is repeated until the resolution of the display being utilized is reached or the portion of the objects within a subdivision is simple enough to determine which surfaces of the object are to be displayed.

This subdivision process is graphically illustrated in FIG. 5. The view plane 17 is dimensionally a square and has been subdivided into four subsquares 18, 20, 22 and 24.

The subsquare 24 has been further subdivided into four smaller equal subsquares 26, 28, 30 and 32. Assuming further subdivision is required, then these smaller subsquares would be subdivided in like manner such as illustrated by the subdivision of the subsquare 28 into four even smaller subsquares 34, 36, 38 and 40.

As a convenience for understanding the relationships between the various levels of subsquares, the subsquares may be thought of as following a familial descent. That is, if the subsquare 24 is thought of as the "father," the subsquares 26, 28, 30 and 32 are the "sons." Furthermore, the relationship between the subsquares 26, 28, 30 and 32 is that of "-brothers."

In one preferred embodiment, the subdivision procedure is stopped when the resolution limit of the display is reached since further subdivision results in no improvement in the quality of the image generated. For a typical display having a 1,024×1,024 raster screen, the resolution of the display is reached after the subdivision process is repeated 10 times. The size of the subsquare resulting from the last subdivision is equivalent to one light-emitting dot on the screen and therefore further subdivision would be useless.

The determination of whether or not the portion of the objects within a subdivision is simple enough to be displayed is accomplished by considering the spatial relationship of each polygon with respect to the subdivision being examined.

In the preferred embodiment the spatial relationships determined may be classified into the three following groups:

(1) Enclosing polygons (2) Involved polygons (3) Out polygons

An enclosing polygon is one which completely surrounds the particular subsquare being examined; an involved polygon is one which is partially within the subsquare, that is, either an edge or a vertex is within the subsquare; and an out polygon is one which is completely outside of the subsquare being examined.

Figure 6A:
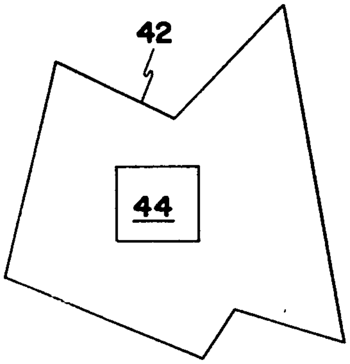
FIGS. 6*a–d* are illustrations of various spatial relationships which are determined by the present invention.

These spatial relationships are graphically illustrated in FIGS. 6a–d. In FIG. 6a, which is an example of an enclosing polygon, a polygon 42 completely surrounds a subsquare 44.

Figure 6B:
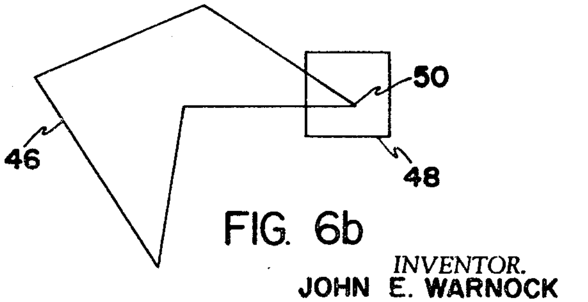
Figure 12:
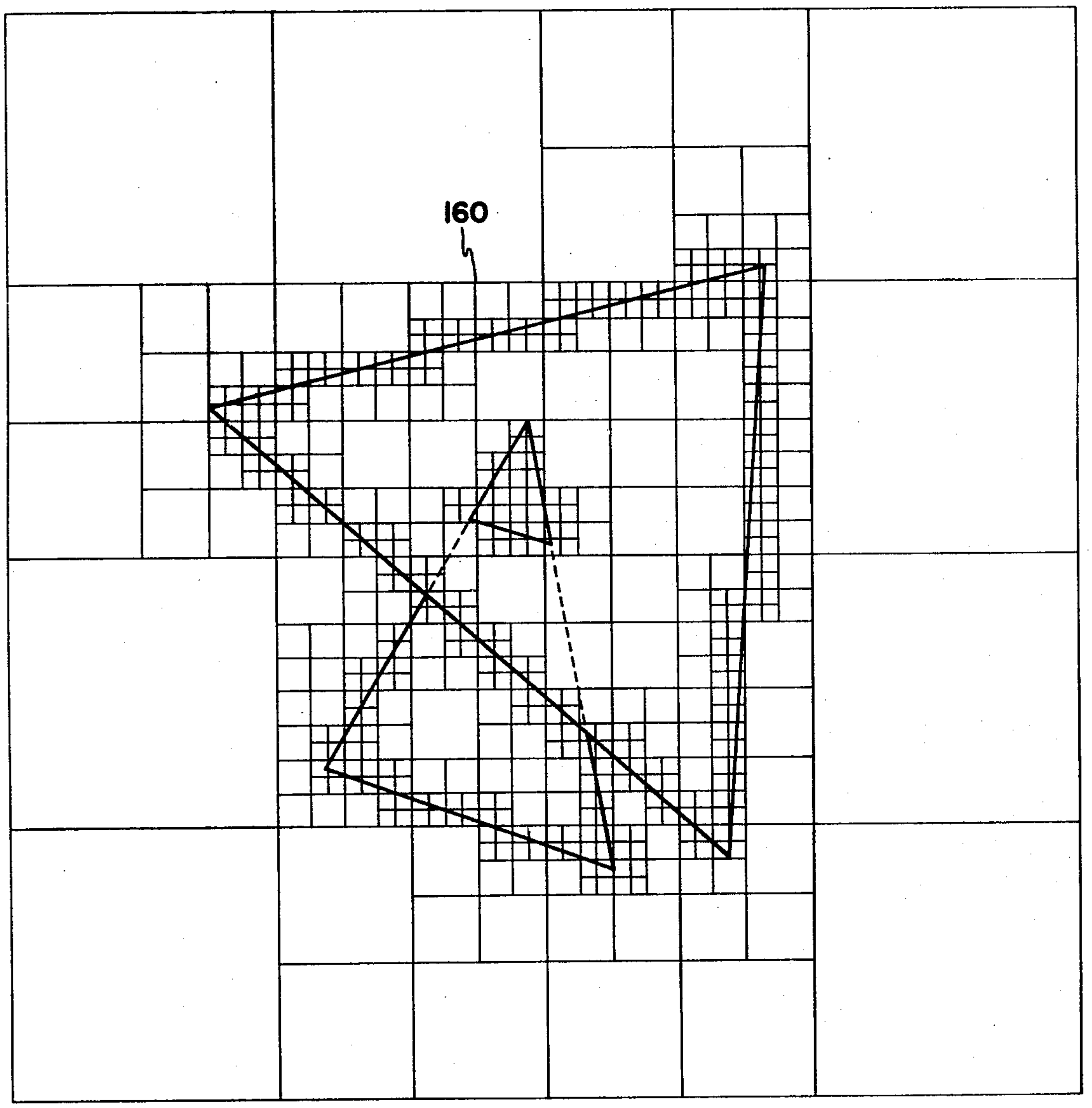
FIG. 12 is a diagrammatic illustration of the embodiment of the subdivision process illustrated in FIGS. 10*a–m* for the objects of FIG. 11.
Figure 6C:
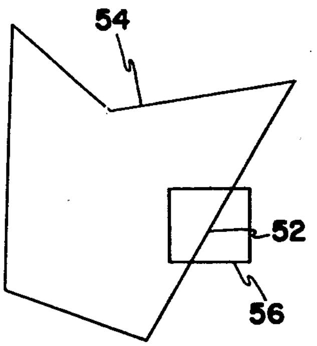

In FIG. 6b, which is an example of an involved polygon, a polygon 46 is partially within a subsquare 48. In this example of an involved polygon a vertex 50 of the polygon lies within the subsquare 48. Alternatively, a polygon may be involved as illustrated in FIG. 6c in which a single segment 52 of a polygon 54 intersects a subsquare 56.

Figure 6D:
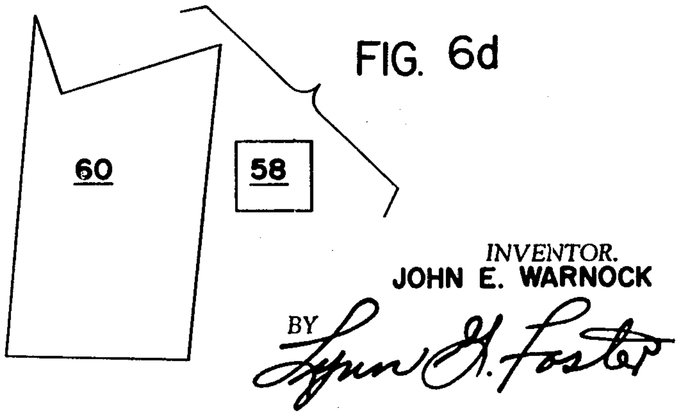

In FIG. 6d, which is an example of an out polygon, a subsquare 58 is completely outside of a polygon 60.

These three spatial relationships may be determined in the following manner. First the polygon is examined to determine whether it is involved with the subsquare. If it is then no further checks need be made. If it is not, then the polygon must be examined to determine whether it is enclosing or out.

The particular tests utilized to perform these two determinations may vary dependent on the restrictions placed on the types of polygons utilized and the speed desired for making the computation.

One approach for determining whether the polygons are involved polygons, where the polygons are made up of straight line or edge segments, comprises checking each line segment to determine whether it can be within the subsquare. This check may be done by comparing the coordinates of each line segment with the coordinates of the subsquare to determine whether either end lies within the subsquare. If neither end lies in the subsquare then the midpoint of the line is calculated and compared with the subsquare coordinates. If the midpoint lies within the subsquare then at least a portion of the line segment is within the subsquare. If not, then at least one-half of the line may be discarded since it can't possibly lie within the subsquare and the other half is examined in the same manner as a new line segment.

The determination of whether or not an end or midpoint of a line segment lies within the subsquare may be accomplished by referencing the end points of the line segment to the coordinates of the subsquare. This may be done by defining the end points in terms of their displacement from the subsquare in the following manner:

$$(x_{pi}-L,\ x_{pi}-R,\ y_{pi}-B,\ y_{pi}-T) \qquad (5)$$

where $x_{pi}$ and $y_{pi}$ are the projected coordinates of a point on a line segment, and where $L$, $R$, $B$ and $T$ are the $x$-coordinates of the left and right edges of the subsquare and the $y$-coordinates of the bottom and top edges of the subsquare respectively.

Figure 7:
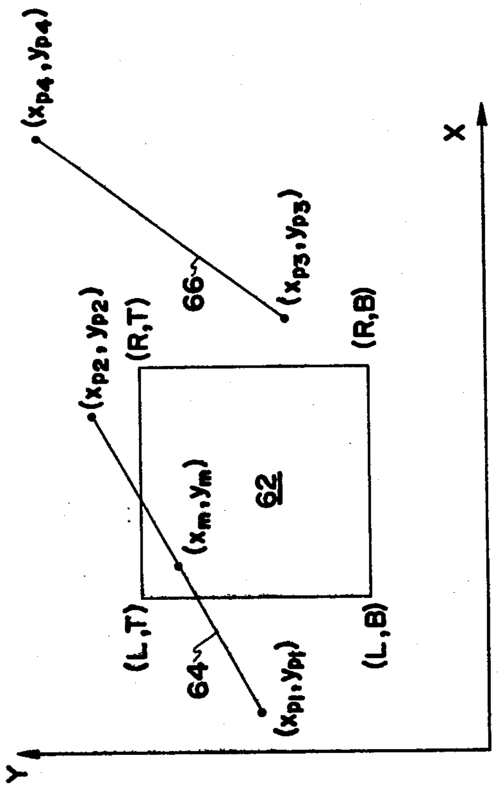
FIG. 7 is a diagrammatic illustration of the determination of one of the spatial relationships obtained by the present invention.

Graphically, this is illustrated in FIG. 7 where a subsquare 62 is defined by the coordinates ($L$, $B$), ($L$, $T$), ($R$, $T$) and ($R$, $B$). A line segment 64 having end points ($x_{p1}$, $y_{p1}$) and ($x_{p2}$, $y_{p2}$), is partially within the subsquare 62. A second line segment 66 having end points ($x_{p3}$, $y_{p3}$) and ($x_{p4}$, $y_{p4}$) lies entirely outside of the subsquare 62.

From a consideration of FIG. 7 and the subsquare referenced coordinates (5) it can be seen that in order for a point to lie within the subsquare the signs of the referenced coordinates must be +, −, +, −, in that order. Therefore, the determination of whether or not a point lies in the subsquare may be made by calculating the referenced coordinates and checking the signs thereof.

For convenience, the signs of the referenced coordinates will be defined as:

$$(S_L,\ S_R,\ S_B,\ S_T) \qquad (6)$$

where $S_L$ is the sign of $x_{pi}-L$
$S_R$ is the sign of $x_{pi}-R$
$S_B$ is the sign of $y_{pi}-B$
$S_T$ is the sign of $y_{pi}-T$.

If $S_R$ and $S_T$ are complemented then an output code defined as $$OC=S_L,\ \bar{S}_R,\ S_B,\ \bar{S}_T \qquad (7)$$

would be 1, 1, 1, 1 for all points within the subsquare where + is 1 and − is 0.

Figure 8:
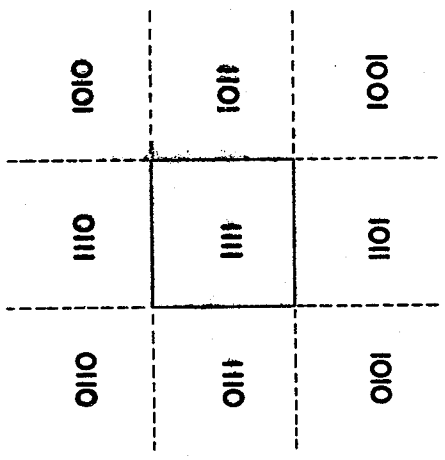
FIG. 8 is a table of values utilized in one embodiment for determining one of the spatial relationships in the present invention.

The Output Codes $OC$ for points in various portions around and within the subsquare are illustrated in FIG. 8. Referring to FIG. 8, the output code within a subsquare 68 is 1, 1, 1, 1. The output codes for points lying above, below, to the right, to the left and combinations thereof are also set forth in FIG. 8.

Referring to FIGS. 7 and 8, the output code for the end points of line segment 64 will be 0111 and 1110. Since neither of these points lies within the subsquare 62 the output code for the midpoint ($x_m$, $y_m$) will be determined to be 1111 thus indicating that the polygon of which the line segment 64 is a part is involved with the subsquare 62. No further line segments would then need to be examined. The output codes for the line segment 66 would be 1011 and 1010. The midpoint however would not have to be checked since the output codes for the end points indicate that they are both to the right of the subsquare. Since the line segments are restricted to be only straight lines it cannot possibly pass through the subsquare 62. This decision on the basis of the output codes also applies to line segments, the end points of which lie above, below or to the left of the subsquare. Therefore, the use of the output codes provides a simplified technique for determining whether or not a polygon is involved with a particular subsquare.

If none of the line segments have portions within the subsquare then the polygon is either enclosing or out. If the polygons are restricted to be convex the output codes for the end points of the line segments of the polygon can be checked to determine which of these conditions apply by whether the polygon surrounds the subsquare or not. If the polygons are not so restricted then a different procedure for determining whether the polygon is enclosing or out must be utilized.

One such procedure which may be utilized comprises testing one corner of the subsquare to determine whether it is within the polygon. If it is then the polygon must be enclosing. If it is not then the polygon is out. This determination may be made by counting up the number and directions of crossings by the polygon of a ray emanating from the corner being checked. The directions of the crossings are determined by following a closed path around the polygon in either a clockwise or counterclockwise manner and considering the direction of the crossing to be the direction along this closed path at the crossing. In a coarse sense such directions of crossings may be considered to be positive or negative. If the number of positive and negative crossings are equal, the subsquare is outside of the polygon and the polygon is an out one with respect to that subsquare. If the number of positive and negative crossings are not equal then the corner is within the polygon and the polygon is enclosing with respect to that subsquare.

To simplify the calculations the ray may be chosen to be equal to the $y$-coordinate of the corner being examined. Then the sign of the crossing depends on whether the ray is crossed when the closed path being followed extends in an increasing Y-direction or a decreasing Y-direction.

Figure 9A:
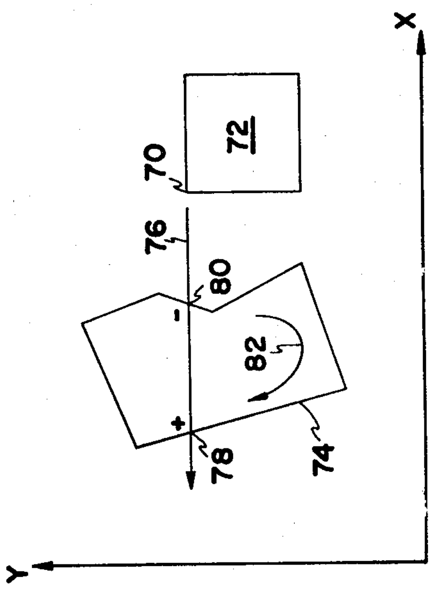
FIGS. 9*a* and 9*b* are diagrammatic illustrations of the determination of two of the spatial relationships determined in the present invention.
Figure 9B:
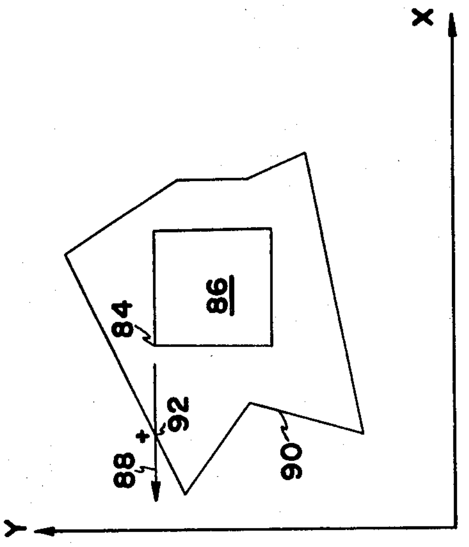

This is graphically illustrated in FIGS. 9a and 9b. In FIG. 9a a corner 70 of a subsquare 72 is being checked to determine whether it is within the polygon 74. A ray 76 equal to the $Y$-coordinate emanates from the corner 70 and is crossed by the polygon at two points 78 and 80. If the polygon is followed in a closed path in a clockwise manner as indicated by the arrow 82, then the crossing 78 is positive since the path at the point of crossing 78 extends in an increasing Y-direction. The crossing 80 is determined to be negative since the path at the point of crossing 80 is extending in a decreasing Y-direction. Since the number of positive and negative crossings are equal then the polygon must be an out polygon.

In FIG. 9b a corner 84 of a subsquare 86 is being checked to determine whether or not it is within a polygon 90. Since a ray 88 from the corner 84 equal to the $y$-coordinate of the corner 84 has only a single positive crossing 92 with the polygon, the polygon is enclosing.

The number of positive and negative crossings may be determined by establishing the relationships between the end points of the line segments of the polygon and the coordinates of the corner tested. These relationships will now be described for a ray having a constant $y$-coordinate which is equal to the $y$-coordinate of the corner. Specifically, if the $y$-coordinates of both end points are either below or above the $y$-coordinate of the corner, then that line segment does not cross the ray. If the $y$-coordinates of the end points are on opposite sides of the $y$-coordinate of the corner (i.e., one is above and one is below), then that line segment may cross the ray depending on the $x$-coordinates of the end points. If the $x$-coordinates of the end points are both on the side of the corner towards which the ray extends then there is a crossing. If the $x$-coordinates of the end points are both on the other side of the $x$-coordinate of the corner then there is no crossing. If, however, the $x$-coordinates of the end points are on opposite sides of the $x$-coordinate of the corner then a further check must be made to determine whether the ray is crossed or not. This determination involves considering the equation of the line segment to determine the value of the $x$-coordinate of the line segment where the $y$-coordinate equals the $y$-coordinate of the corner.

If the $x$-coordinate at this point is on the side of the corner towards which the ray extends then there is a crossing. If it is on the other side then there is no crossing.

The sign of the crossing, as mentioned previously depends on the direction in which the polygon is followed around a closed path.

If the ray is assumed to be extending in a decreasing X-direction and the polygon is traversed in a clockwise direction as illustrated in FIGS. 9*a* and 9*b*, then these conditions may be expressed mathematically as follows:

If:

$$\left.\begin{array}{ccccc} y_i > y_c & & y_i \leq y_c & & x_i > x_c \\ & \text{or} & & \text{or} & \\ y_j > y_c & & y_j \leq y_c & & x_j > x_c \end{array}\right\} \text{then NO CROSSING}$$

If:

$$\left.\begin{array}{l} y_i \leq y_c \\ y_j > y_c \\ x_i \leq x_c \\ x_j \leq x_c \end{array}\right\} \text{then POSITIVE CROSSING}$$

If:

$$\left.\begin{array}{l} y_i > y_c \\ y_j \leq y_c \\ x_i \leq x_c \\ x_j \leq x_c \end{array}\right\} \text{then NEGATIVE CROSSING}$$

If:

$$\left.\begin{array}{l} y_i \leq y_c \\ y_j > y_c \\ x_i \leq x_c \\ x_j > x_c \\ \text{OR} \\ x_i > x_c \\ x_j \leq x_c \end{array}\right\} \begin{array}{l} \text{AND } (x_c-x_i)(y_j-y_i)-(y_c-y_i)(x_j-x_i) \geq 0 \\ \text{(8) then POSITIVE CROSSING} \end{array}$$

If:

$$\left.\begin{array}{l} y_i > y_c \\ y_j \leq y_c \\ x_i \leq x_c \\ x_j > x_c \\ \text{OR} \\ x_i > x_c \\ x_j \leq x_c \end{array}\right\} \begin{array}{l} \text{AND Equation (8) } \leq 0 \text{ then} \\ \text{NEGATIVE CROSSING} \end{array}$$

where $x_c$, $y_c$ are the coordinates of the subsquare corner being checked, and $x_i$, $y_i$ and $x_j$, $y_j$ are the coordinates of the end points of the line segment being checked with the segment being traversed from $i$ to $j$.

Of course, other methods for determining the spatial relationships of the polygons may be used alternatively.

For example, the determination of whether or not a polygon is involved may be accomplished by first determining whether or not any of the vertices of the polygon are within the subsquare. This determination may be made in the same manner as the determination of whether a corner of the subsquare was within a polygon. If no vertices are within the subsquare then the segments of the polygon must be checked to determine whether or not any intersect the subsquare. This determination may be made by checking whether any of the segments intersect either of the diagonals of the subsquares. Although this latter determination can be ambiguous when an enclosing polygon intersects the diagonals at the corners of the subsquare, it is assumed, if an intersection occurs, the polygon is involved.

Furthermore, the determination of whether a polygon is enclosing or out could be made by summing the angles of the vertices of the polygon with respect to the subsquare. If the sum of the angles is zero then the polygon is out; if 360° then the polygon is enclosing.

Once the spatial relationships of all the polygons are determined, the polygons are ordered in a list with all the enclosing, involved and out polygons in that order. The determination of the visible polygon within the particular subsquare is then made, if possible. This is accomplished by calculating the Z distance of the polygon from each of the four corners of the subsquare. This distance calculation may be found simply by solving for Z in equation (4) using the coefficient constants $a$, $b$ and $c$ previously calculated and the $x$- and $y$-coordinates of the corners of the subsquare. This calculation is done only for enclosing and involved polygons since all out polygons are not relevant to the particular subsquare. If an enclosing polygon is determined to be in front of all other polygons, then it must be the visible surface in that subsquare. If, however, other polygons may be at least in part closer, then further subdivision is necessary. If no enclosing polygon is found to be in front of all other polygons the subdivision process is terminated when the resolution limit of the polygon is reached, which in this example would be after nine successive divisions. When this occurs the polygon which has a portion nearest to the subsquare is considered to be the visible surface.

The number of computations necessary in the subdividing process may be materially reduced by recognizing certain features of the process. For example, once a polygon is determined to be either enclosing or out for a particular subsquare, it must be the same for all "sons" of that subsquare and these determinations need not be made for those "sons." In fact, for subdivisions of a subsquare, only the involved polygons must be checked to see if their spatial relationship has changed. If such an involved polygon is determined to be enclosing with respect to a subdivision, then it may be added at the bottom of the list of enclosing polygons. If it is determined to be out with respect to that subdivision, it may be added to the top of the list of the out polygons. Once the subdivision process has been completed for one subsquare and its lineal descendants, then the list of polygons may be restored to what it was at the beginning of the subdivision of that subsquare for consideration of "brother" subsquares.

In addition, other information may be saved which will also materially reduce the number of computations. For example, if an involved polygon has only one segment within a subdivision, information identifying that segment may be stored so that on further subdivisions of that subsquare, only that segment must be checked to determine whether it is within the "-sons" of that subsquare. Also, if the alternative method for determining the spatial relationship is utilized then the check on the vertices of the polygons may be dispensed with since if none of the vertices were in the "father" subsquare, they could not be in any of the "sons." Furthermore, involved polygons whose shortest Z-distance to a corner of the subsquare being checked is greater than the longest Z-distance of an enclosing polygon from a corner of the subsquare need not be considered since they could not possibly be visible.

Figures 10A, 10B:
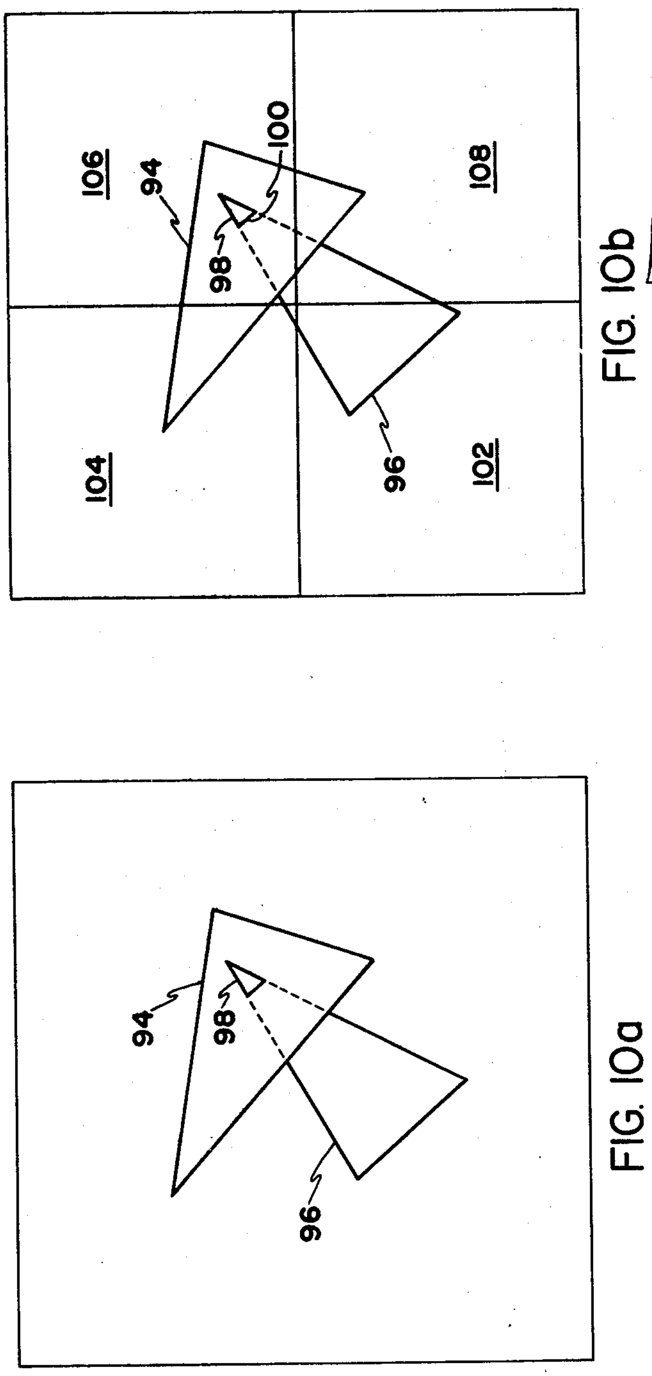

In order to more fully explain the subdivision process reference will now be made to FIGS. 10*a–m*, which graphically illustrate the subdivision process for a single intersection of objects. Referring to FIG. 10*a*, two planar triangles 94 and 96 are utilized to depict an object to be displayed. As can be seen from FIG. 10*a*, the upper triangle 94 is intersected by a vertex 98 of the lower triangle 96. The lower triangle 96 is behind the upper triangle 94 and pierces therethrough to expose the vertex portion 98. Furthermore, a large portion of the lower triangle 96 is hidden by the upper triangle 94.

The input data supplied to the present invention would consist of the vertex points of the two triangles 94 and 96 and would appear as in FIG. 10*b*, if drawn with all lines showing. The intersection of the two triangles 94 and 96 is indicated by a line 100. In FIG. 10*b* the view plane has been subdivided into four subsquares 102, 104, 106 and 108. It can be seen from FIG. 10*b* that the triangles 94 and 96 have portions which extend in all of the subsquares. These subsquares are then successively examined to determine whether the object surfaces visible therein are simple enough to display directly or if further subdivision is required. Arbitrarily, the lower left subsquare 102 is checked first. Since the portion of the triangle 96 which extends into subsquare 102 does not entirely occupy the subsquare, the subsquare must be subdivided further.

Figures 10C, 10D, 10E:
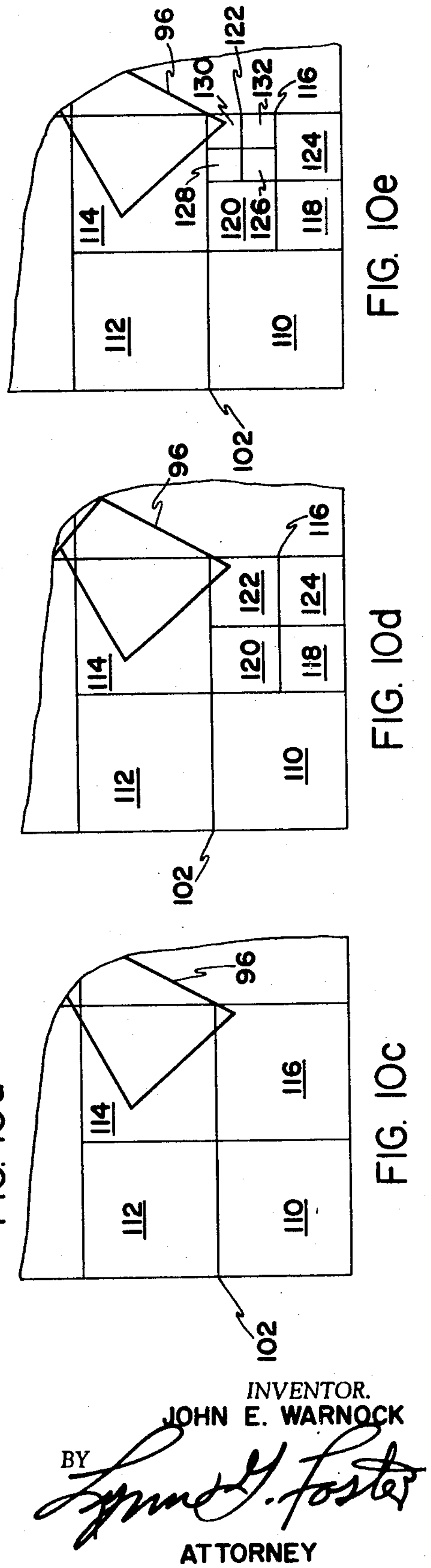

This step is illustrated in FIG. 10*c* in which subsquare 102 has been further subdivided in subsquares 110, 112, 114 and 116. These subsquares are then checked successively to determine whether any surfaces of the objects to be displayed are contained therein and if so whether a determination may be made as to what is to be displayed. As can be seen from FIG. 10*c*, subsquares 110 and 112 contain no information and therefore nothing further must be done with them. Subsquares 114 and 116 do contain portions of the triangle 96 and therefore they must be further subdivided as shown in FIG. 10*d*.

In FIG. 10*d*, subsquare 116 has been further subdivided into four smaller subsquares 118, 120, 122 and 124. Examination of these subsquares indicates that only the subsquare 122 contains any portion of a surface of the object to be displayed. Therefore, as illustrated in FIG. 10*e* subsquare 122 has been further subdivided into subsquares 126, 128, 130 and 132. Subsquares 126, 128 and 132 contain no portions of the objects to be displayed and therefore further subdivision is not required. Subsquare 130, however, does contain a vertex of the triangle 96, and must be further subdivided since the triangle does not entirely occupy the subsquare.

Figure 10I:
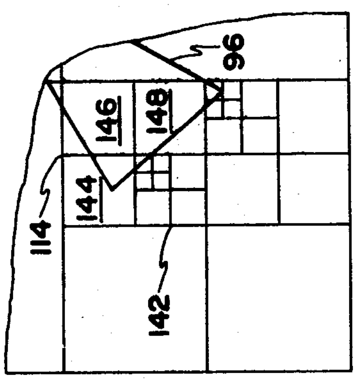
Figure 10H:
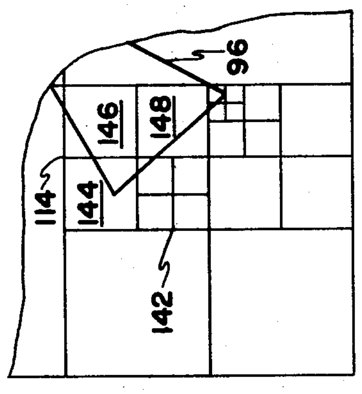
Figure 10G:
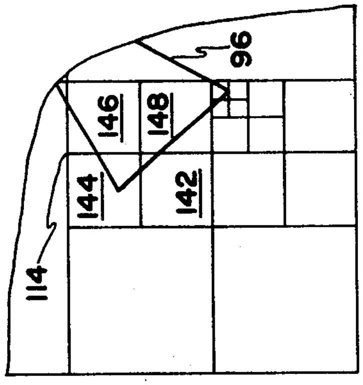
Figure 10F:
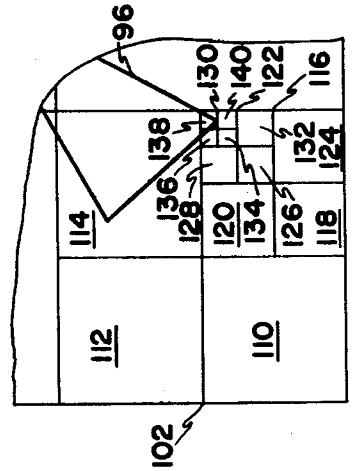

FIG. 10*f* illustrates the subdivision of subsquare 130 into subsquares 134, 136, 138 and 140. From FIG. 10*f* it can be seen that subsquares 134 and 140 do not contain any portion of the objects and therefore further subdivision is not required. Subsquares 136 and 138 do contain portions of the triangle 96 and therefore they would require further subdivision. However, for this graphical illustration the resolution of the system will be assumed to be reached by this fifth subdivision and therefore the triangle 96 will be assumed to be visible in the subsquares 136 and 138 and information to that effect will be fed out for subsequent display.

The process is then repeated for the subsquare 114 as illustrated in FIGS. 10*g*–10*i*. In FIG. 10*g*, the subsquare 114, has been subdivided into four subsquares 142, 144, 146 and 148. Previously mentioned reference numerals have not been included in FIG. 10*g* and subsequent drawings of this series for clarity. The subsquare 142 is then further subdivided two more times as illustrated in FIGS. 10*h* and 10*i* for the particular subsquares thereof which contain portions of the objects.

Figure 10K:
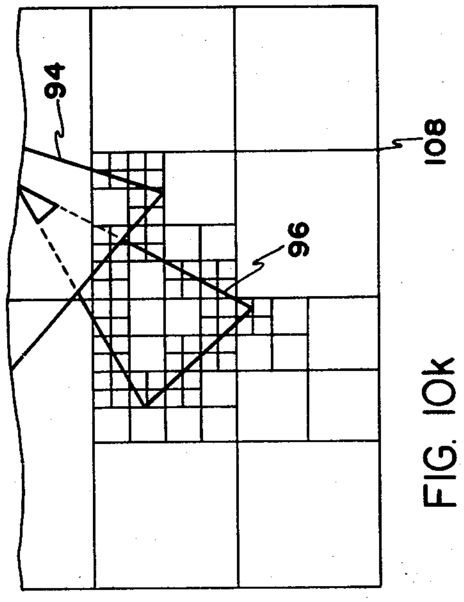
Figure 10J:
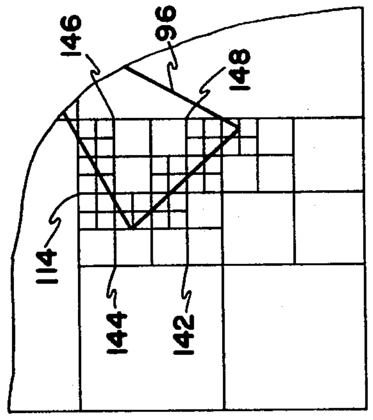

FIG. 10*j* illustrates completion of the subdivision process for the subsquares 144, 146 and 148. It can be seen from FIG. 10*j* that the subdivision process proceeds to the finest resolution along the edges of the object to be displayed.

FIG. 10*k* illustrates the subdivision process proceeding for the subsquare 108. Note that the finest resolution of the subdivision process continues to occur along the edges of the objects to be displayed and also along the intersection between the triangles 94 and 96.

FIG. 10"el" illustrates the subdivision process completed for the subsquare 106. In FIG. 10"el," the subsquare 150 in the area of overlap between the triangles 94 and 96 is not further subdivided since the triangle 94 completely occupies the subsquare and is in front of the triangle 96 in this subsquare. Also the finest resolution of the subdivision process must be reached along the intersection between the two triangles 94 and 96.

FIG. 10*m* illustrates the completion of the subdivision process for the objects to be displayed.

Figure 11:
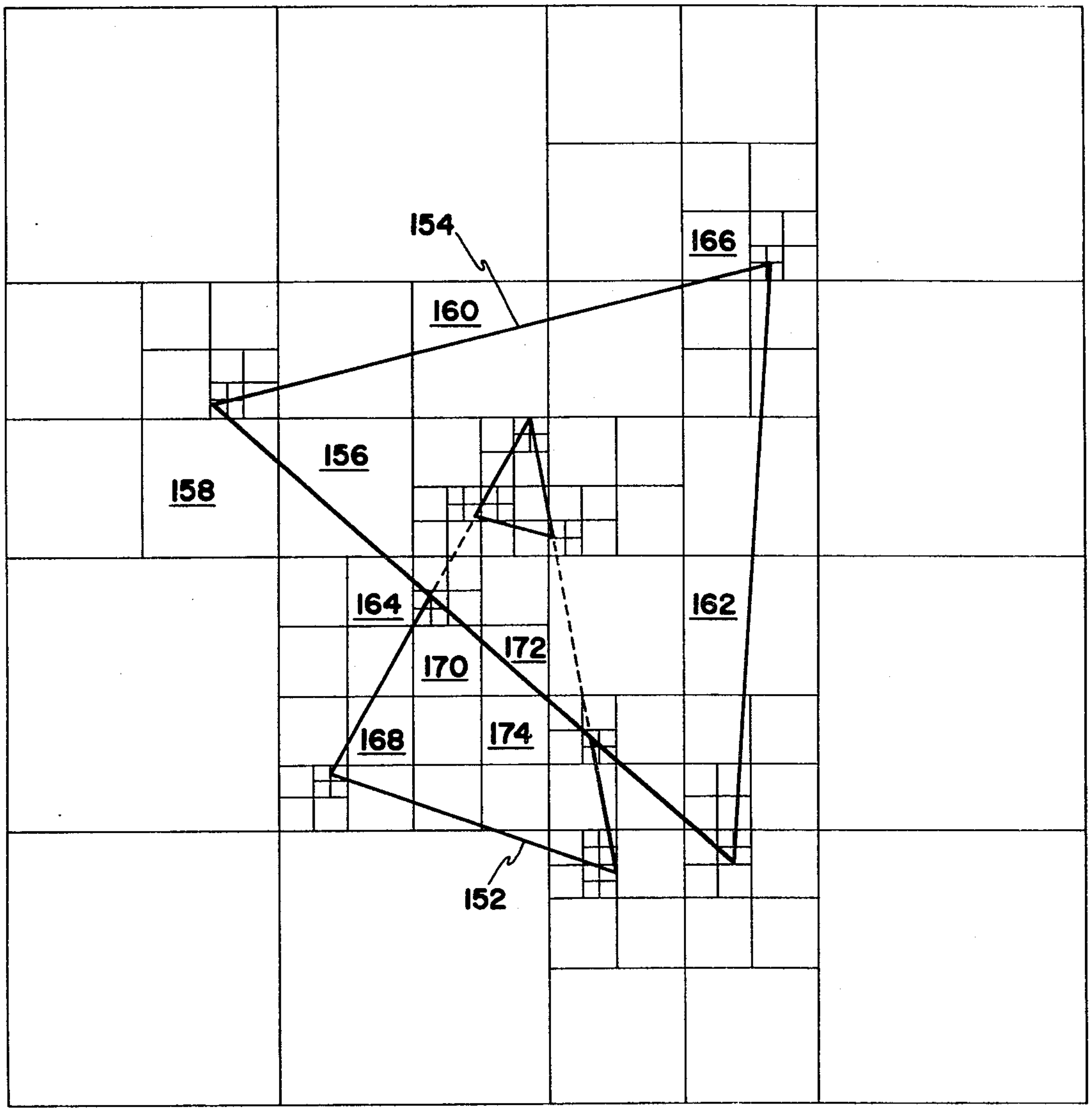
FIG. 11 is a diagrammatic illustration of an alternative embodiment of a subdivision process which may be utilized in the present invention.

In the previous example illustrated in FIGS. 10*a–m* it is assumed that the subdivision process proceeds until either an enclosing polygon exists and is in front of all other polygons or the resolution limit of the display has been reached. This procedure may be altered somewhat to reduce the number of subdivisions required. For example, when a subsquare is occupied by only a single visible involved polygon having a single line segment which intersects the subsquare, or by two involved polygons which are visible on opposite sides of a line segment then the subdivision process could be stopped for that subsquare and information regarding the intersecting line segment could be retained to appropriately control the display of that subsquare. An example of a completed subdivision process in which this alternate procedure is utilized is graphically illustrated in FIG. 11. In FIG. 11 a pair of intersecting triangles 152 and 154 similar to those shown in FIGS. 10*a–m* are subjected to the subdivision process with the alternate procedure followed.

As can be seen from FIG. 11 several third level subdivisions include only a line segment of a single visible involved polygon and therefore are not further subdivided. Examples of these subdivisions are subsquares 156, 158, 160 and 162. Several fourth level subdivisions also contain only a single line segment of a visible involved polygon and therefore are not further subdivided. Examples of such subsquares are subsquares 164, 166 and 168. In addition, several fourth level subsquares contain only two involved polygons which are visible on opposite sides of a line segment and therefore are not further subdivided. Examples of such subsquares are subsquares 170, 172 and 174.

The shading of the objects is determined by calculating the apparent illumination of the visible surface within each subsquare and modifying the intensity of the display in accordance therewith. The procedure for accomplishing this may be the same as utilized in the Romney application cited above. As pointed out in the Romney et al. application, provision may be made for providing arbitrary illumination of particular surfaces as well as providing various colors therefor.

General Block Diagram

Figure 13:
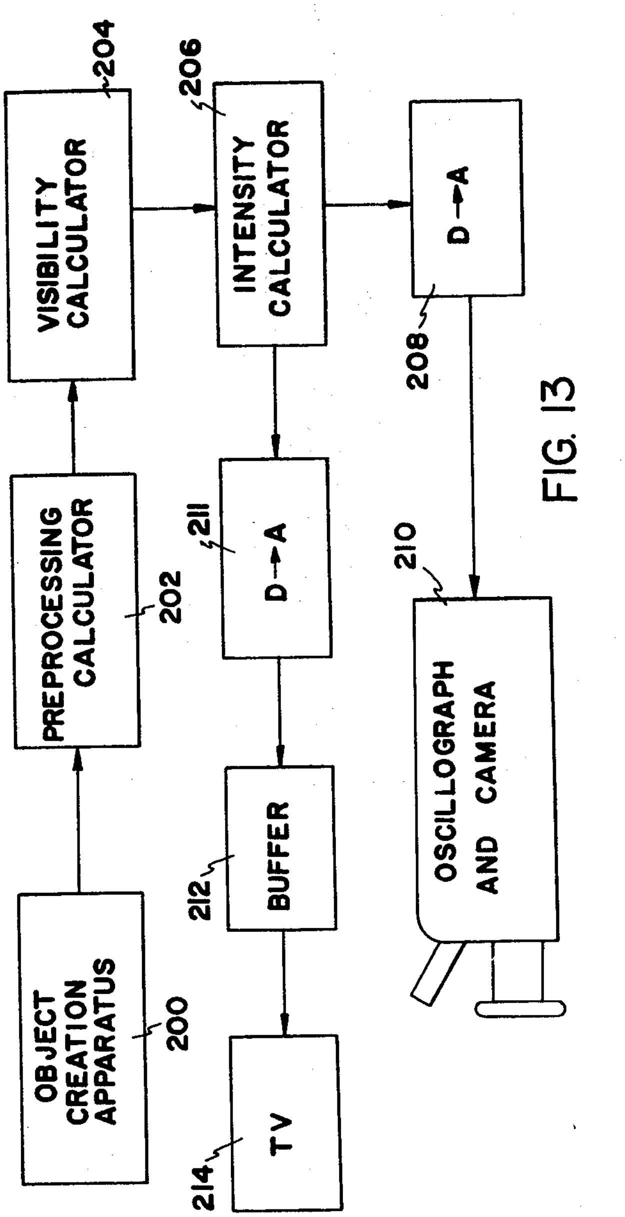
FIG. 13 is a block diagram of an embodiment of the system of the present invention.

The procedure as described hereinabove is carried out electronically in the following manner. Referring to FIG. 13 the electronic input data representative of the vertex points of the polygons are electrical signals which may be supplied from an object creation apparatus 200. The object creation apparatus may include any or all of a plurality of devices such as those disclosed in the Romney et al. application cited above (see FIG. 8 and the accompanying description therein).

These electrical signals representative of the vertex points of the polygons are supplied to a preprocessing calculator 202. The preprocessing calculator 202 calculates the transformation of the electrical input signals representing the vertex points and calculates the coefficients $a$, $b$ and $c$ of equation (4).

The transformed vertex points and the coefficient constants are fed to a visibility calculator 204. The visibility calculator 204 subdivides the view plane or the viewing screen of the display and determines which polygons are visible in each of the subdivisions created. This information is then supplied to an intensity calculator 206 which controls the intensity of the display to generate a shaded perspective image.

The intensity calculator may comprise an intensity parameters calculator and a shader as disclosed in the Romney et al. application cited above (see FIGS. 5, 7, and 21–24 and the accompanying description therein). The intensity calculation as determined by the intensity calculator 206 may be displayed by supplying them through a conventional D→A converter 208 to modify the intensity of the electron beam of an oscillograph and time delay camera arrangement 210. Alternatively, the intensity calculations may be fed through a conventional D→A converter 211 and a buffer 212 to a TV display 214. These may be of the type described in the Romney et al. application cited above (see FIG. 5 and the accompanying description therein). The signals could also be used to control conventional plotters through suitable interfacing equipment.

Detailed Block Diagram of One Preferred Embodiment

Figure 14:
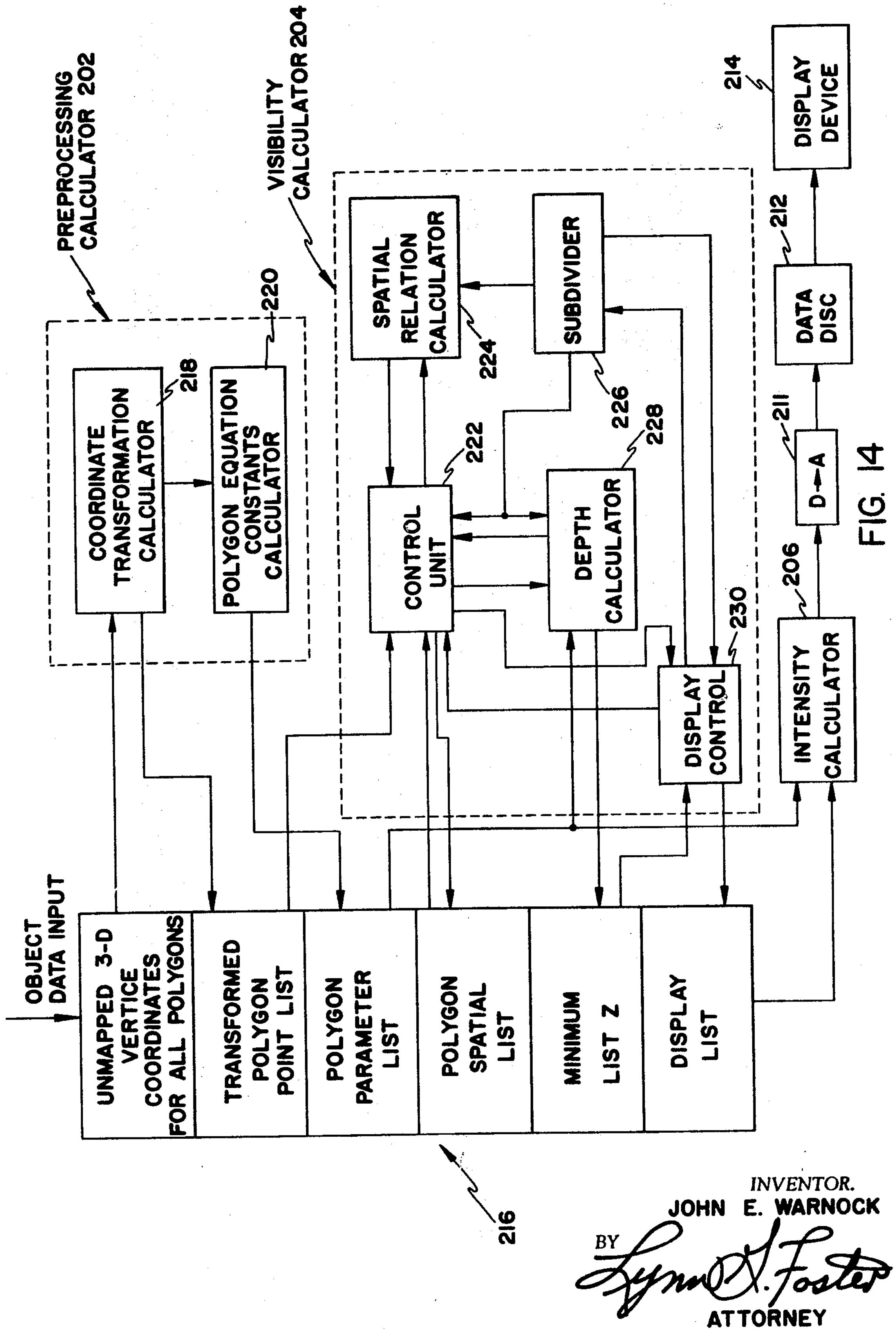
FIG. 14 is a more detailed block diagram of the embodiment of the system shown in FIG. 13.

Referring to FIG. 14, a preferred embodiment of the present invention will now be described. For simplicity, the embodiment chosen utilizes electrical input data representative of the vertex points of planar polygons and are ordered to form a closed loop to define the polygon. Moreover, the subdivision technique utilized will be the procedure exemplified by FIGS. 10*a–m*.

The electrical input signals, representative of the vertex points, of the planar polygons which describe the surfaces of the objects to be displayed are supplied from the object creation apparatus 200 (see FIG. 13) to a portion of a memory 216 labeled UNMAPPED 3-D VERTICE COORDINATES FOR ALL POLYGONS.

These signals are then fed to the preprocessing calculator 202 for transforming the electrical signals and calculating the constant coefficients *a*, *b* and *c* of the polygon plane equation (4). To perform these functions, the preprocessing calculator includes a coordinate transformation calculator 218 which stores the transformed coordinates of the vertex points in a portion of memory 216 labeled TRANSFORMED POLYGON POINT LIST; and a polygon equation constants calculator 220 which calculates the constant coefficients *a*, *b* and *c* for each polygon and stores them in a portion of the memory 216 labeled POLYGON PARAMETER LIST. The polygon equations constants calculator 220 may be similar to the triangle equation constants calculator disclosed in the Romney at al. application cited above (see FIGS. 14*a* and 14*b* and the accompanying description therein) and, therefore, will not be disclosed in detail herein.

The transformed vertex points are then fed to the visibility calculator 234 which subdivides the view plane or viewing screen of the display as appropriate and determines the polygons to be displayed within the subsquares created. The visibility calculator 204 includes a control unit 222, a spatial relation calculator 224, a subdivider 226, a depth calculator 228 and a display control 230.

The control unit 222 essentially functions as a computation reducer, by maintaining the POLYGON SPATIAL LIST stored in that named portion of the memory 216 and saving pointers which structure the list for the various "father" subsquares. With these saved list structures and depth and subsquare information from the depth calculator 228 and the subdivider 226, the control unit 222 may then control the accessing of the appropriate information to the spatial relation calculator 224, the depth calculator 228 and the display control 230.

Specifically, once the first subdivision has occurred, the control unit 222 accesses only involved polygon vertex points, as determined from the polygon spatial lists, to the spatial relation calculator 224, since, if a polygon was enclosing or out with respect to the "father" it must be the same with respect to the "son." In addition, the control unit 222 may delete from consideration by the spatial calculator 224 and the depth calculator 228 those polygons whose nearest corner is farther away than the most distant corner of an enclosing polygon. Furthermore, the control unit 222 functions to supply a signal to the display control 230 indicating whether a polygon which is nearest to a subsquare at all four corners is enclosing and therefore visible in that subsquare.

The control unit therefore encompasses a plurality of search and decision functions which are primarily designed to reduce the number of computations required. If the control unit were not present, the visibility calculator could still function except that all polygons would necessarily have to be examined completely for each new subsquare. The control unit 222 may comprise suitable logic and memory circuits for performing these functions or, alternatively, may be a small general purpose computer appropriately programmed. Since such logic design and such programming are within the ability of those skilled in the art, the details of the program are not disclosed herein.

The spatial relation calculator 224 examines those polygons accessed through the control unit 222 to determine the spatial relationship between the polygons and the subsquare presently being examined supplied under the control of the display control 230.

The subdivider 226 calculates the next appropriate subsquare to be examined and supplies these signals to the spatial relation calculator 224 and the control unit 222. The display control 230 supplies a signal to the subdivider indicating whether to go on to the next subsquare or subdivide the present subsquare further. Upon reaching the resolution limit of the display, the subdivider will indicate this state to the display control 230 to cause it to record the polygon with the nearest corner as visible within that subsquare.

The depth calculator 228 receives the coefficient constants of the polygons and under the control of control unit 222 calculates the depths of each polygon from the four corners of the subsquare. The depth calculator 228 keeps a running record of the polygons with the minimum distance from each corner and then supplies these signals to a portion of the memory 216 labeled MINIMUM LIST Z. The depth calculator 228 may be similar to the hidden line calculator disclosed in the Romney et al. application cited above (see FIGS. 7, 20*a* and 20*b* and the accompanying description therein) and, therefore, will not be disclosed in detail herein.

The display control 230 receives signals representing the polygons having the minimum distance from each corner and determines whether or not the same polygon has the minimum distance from each of the corners. If the same polygon does have the minimum distance from each of the corners the display control calls for the control unit 222 to indicate whether this polygon is an enclosing polygon. If the answer is yes, then the display control 230 accesses the polygon number with the pertinent information about the subsquare to the DISPLAY LIST portion of the memory 216. If it is not, or if different polygons have the minimum distance to the corners then the display control 230 enables the subdivider 226 to subdivide further. If the subdivision is already at the resolution limit of the display, the subdivider 226 will so indicate to the display control 230, which will then output the pertinent subsquare information and the polygon with the minimum distance to any of the corners.

The DISPLAY LIST portion of the memory 216 will then contain information describing the subsquare and the polygon visible therein. This information may then be fed to the intensity calculator 206 which is also supplied with the constant coefficients of the equations from the POLYGON PARAMETER LIST portion of the memory 216 to determine the appropriate functions for generating a shaded perspective image. As mentioned previously, the intensity calculator 206 may be similar to the one disclosed in the Romney et al. application cited above. The only modification necessary to the Romney et al. intensity calculator would be suitable circuitry for determining the appropriate segment information along each scan line. This can easily be done since the sizes of the subsquares and their location are provided. The output of the intensity calculator is then supplied through the D→A converter 211 and buffer 212 which may be a data disc to a display device 214 which may be a TV display.

Coordinate Transformation Calculator

Figure 15:
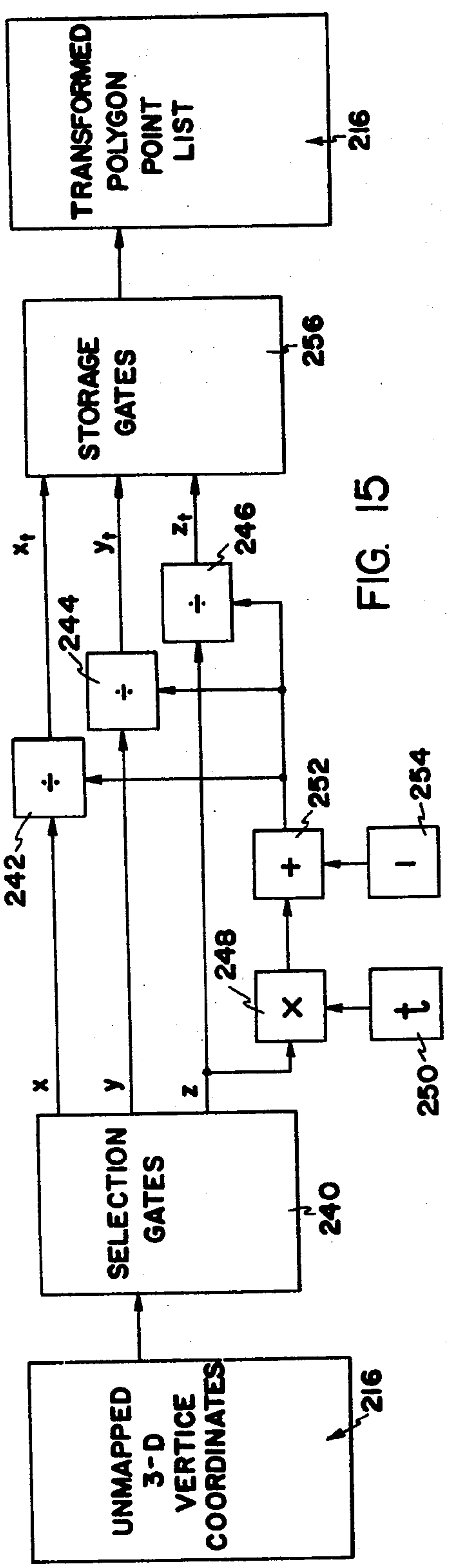
FIG. 15 is a schematic diagram of an embodiment of the coordinate transformation calculator.

Referring to FIG. 15, a suitable coordinate transformation calculator will now be described. The electrical signals representative of the vertex points of the polygons $(x, y, z)$ as stored in the portion of the memory 216 labeled unmapped 3-D vertex coordinates are fed to a set of selection gates 240. The $x$-, $y$- and $z$-coordinates are fed from the selection gates 240 to a plurality of dividers 242, 244 and 246, respectively. In addition, the $z$-coordinate is fed to a multiplier 248 which is also supplied with the value $t$ of the transformation constant from a register 250. The output of the multiplier 248 is fed to an adder 252 which is also supplied with the value 1 from a register 254. The output of adder 252 is supplied to a second input of the dividers 242, 244 and 246. The outputs of the dividers 242, 244 and 246 are signals representing the transformed coordinates $x_t$, $y_t$ and $z_t$ of the polygon vertex points. These signals are then fed through a set of storage gates 256 to the transformed polygon point list portion of the memory 216.

In operation the coordinate transformation calculator functions to calculate the transformed values of the coordinate in accordance with equations (1), (2) and (3). Selection gates 240 act to access the three unmapped coordinates of each vertex point to the calculating portion of the circuit. These selection gates 240 are not shown in detail as they are simply appropriately enabled AND gates which sequentially feed the vertex points to the calculator. Alternatively, additional calculating portions could be provided to perform the transformation in parallel. The calculator section merely calculates the denominator of each of the equations (1), (2) and (3) by multiplying the signal representing the $z$ coordinate times the value $t$ in multiplier 248 and then adding 1 to this value in the adder 252. This denominator is supplied to each of the dividers for providing an output signal equal to the unmapped coordinates divided by this denominator. The storage gates 256 are also not shown in detail since they are also merely a plurality of AND gates which are sequentially enabled to store the data in the transformed polygon point list portion of the memory 216.

Spatial Relation Calculator

Figure 16A:
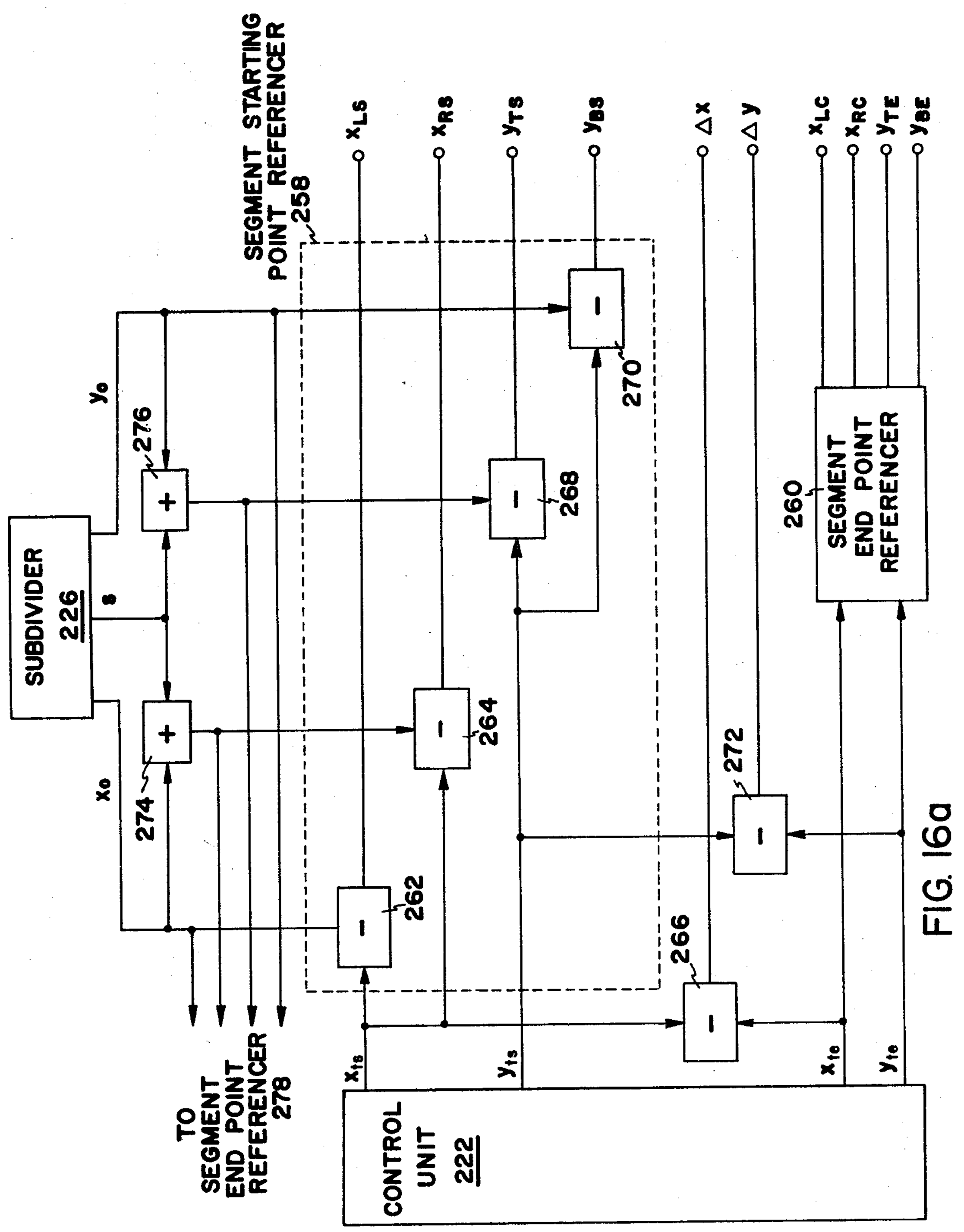
FIGS. 16*a*, *b* and *c* are schematic diagrams of different portions of an embodiment of the spatial relation calculation.
Figure 16B:
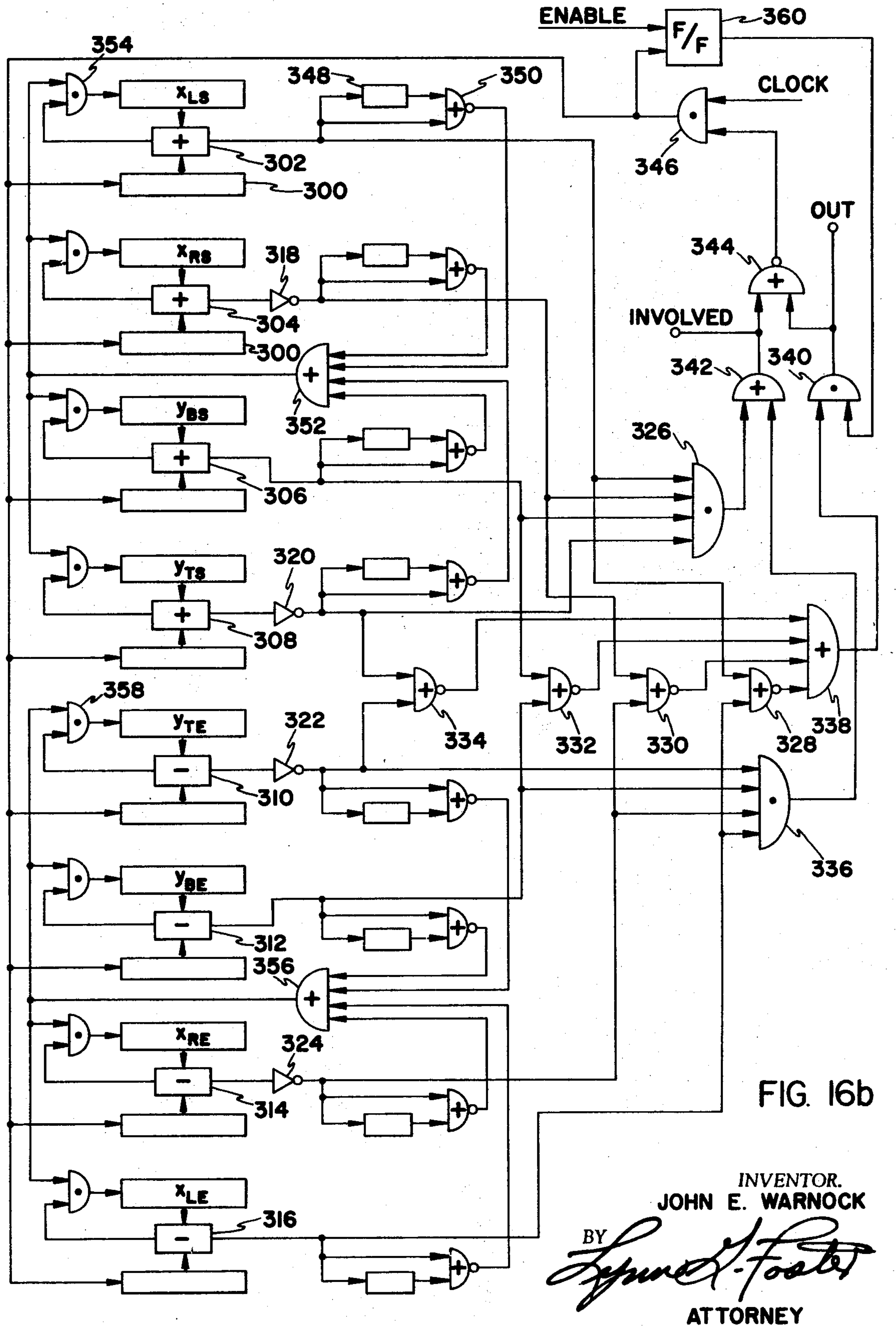
Figure 16C:
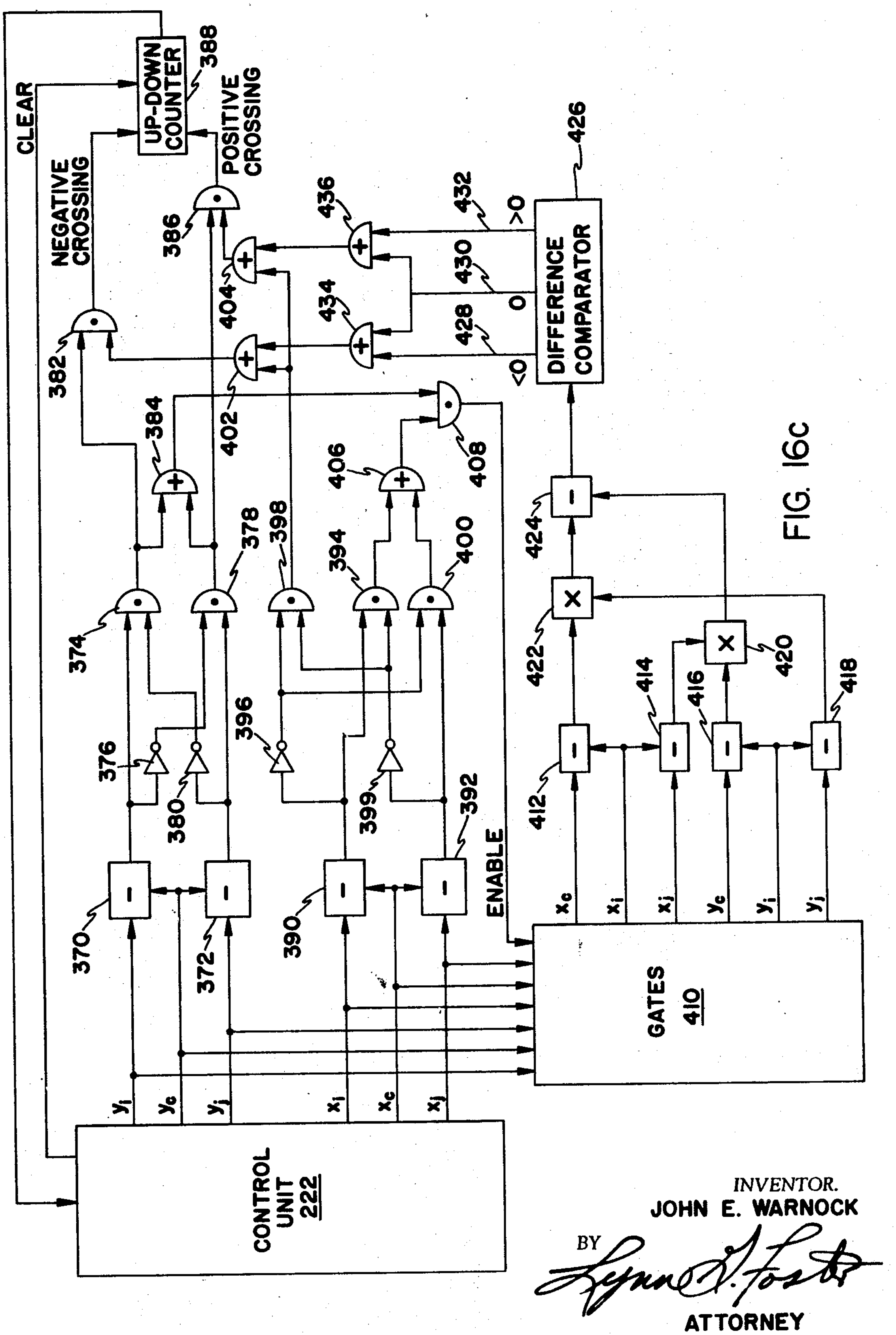

Referring to FIGS. 16*a*, 16*b* and 16*c*, one embodiment of the spatial relation calculator 224 will now be described. As described previously, the spatial relation calculator 224 must first calculate the coordinates of the line segment end points of the polygons with respect to the coordinates of the subsquare. This referencing of the coordinates is accomplished by the circuitry shown in FIG. 16*a*.

The control unit 222 accesses the coordinates of the starting point of the line segment ($x_{ts}$, $y_{ts}$) to the segment starting point referencer 258. The control unit 222 also supplies the coordinates of the end point of the line segment ($x_{te}$, $y_{te}$) to the segment end point referencer 260. The segment end point referencer 260 is identical to the segment starting point referencer 258 and therefore is not disclosed in detail.

The coordinate $x_{ts}$ is supplied to a pair of subtractors 262 and 264 in the segment starting point referencer 258 and to a third subtractor 266 which is utilized to calculate the displacement between the starting point coordinates and the end point coordinates. The coordinate $y_{ts}$ is also supplied to a pair of subtractors 268 and 270 in the segment starting point referencer 258 and to a displacement determining subtractor 272.

The coordinates of the subsquare are determined from the coordinates of the lower left-hand corner of the subsquare ($x_o$, $y_o$) and the value of $s$ for that subsquare. The coordinate $x_o$ is supplied from the subdivider 226 to the subtractor 262 and to an adder 274. The coordinate $y_o$ is supplied from the subdivider 226 to the subtractor 270 and to an adder 276. The value $s$ is also supplied from the subdivider to each of the adders 274 and 276, the outputs of which are supplied to the subtractors 264 and 268, respectively. The coordinates $x_o$ and $y_o$ and $x_o+s$ and $y_o+s$ are also supplied to the segment end point referencer 260 as indicated by the arrows 278.

The outputs of the subtractors 262, 264, 268 and 270 are the subsquare referenced segment starting point coordinates $x_{LS}$, $x_{RS}$, $y_{TS}$, and $y_{BS}$, respectively. Similarly, the end point coordinates $x_{te}$ and $y_{te}$ are supplied to the segment end point referencer 260 to calculate the subsquare referenced end point coordinates $x_{LE}$, $x_{RE}$, $y_{TE}$, and $y_{BE}$. The coordinates of the end point $x_{te}$, $y_{te}$ are also supplied to the subtractors 266 and 272 to provide an output signal representative of the displacement between the end points $\Delta x$, and $\Delta y$.

In operation, the segment starting point referencer 258 and the segment end point referencer 260 function to calculate equation (5) by appropriately subtracting $x_o$, which is the left-side coordinate of the subsquare, $x_o+s$, which is the right-side coordinate of the subsquare, $y_o$, which is the bottom coordinate of the subsquare, and $y_o+s$ which is the top coordinate of the subsquare. The subtractors 266 and 272 merely calculate the displacement which is needed for subsequent operations.

Once the subsquare referenced coordinates of the starting and end points of the line segment are found then the output codes, in accordance with equation (7), must be checked to determine whether or not the polygon is involved. A circuit for checking the output codes is shown in FIG. 16*b*. The referenced coordinates are each stored in individual registers labeled $x_{LS}$, $x_{RS}$, $y_{BS}$, $y_{TS}$, $x_{LE}$, $x_{RE}$, $y_{TE}$, and $y_{BE}$.

Each of these individual registers have associated therewith a shifting register 300. The starting point referenced coordinate registers $x_{LS}$, $x_{RS}$, $y_{BS}$, and $y_{TS}$ also have associated therewith one of a plurality of adders 302, 304, 306 and 308, respectively. The end point referenced coordinate registers $x_{LE}$, $x_{RE}$, $y_{BE}$, and $y_{TE}$ have associated therewith one of a plurality of subtractors 310, 312, 314 and 316, respectively. Each of the adders 302, 304, 306 and 308 and the subtractors 310, 312, 314 and 316 are connected to receive the output signals from the referenced coordinate registers and the shift registers associated therewith and include a sign and a sum output.

The sign outputs of the adders 304 and 308 and subtractors 310 and 314 are inverted in inverters 318, 320, 322 and 324, respectively, in accordance with equation (7). The sign outputs of the adders 302, and 306 and the inverters 318 and 320 are each fed to one input of an AND gate 326. In addition, each of these output signals are fed to one input of one of a plurality of NOR gates 328, 332, 330 and 334, respectively. The outputs of the subtractors 312, and 316, and the inverters 322 and 324 are fed to an AND gate 336 and are fed to a second input of each of the NOR gates 332, 328, 334, and 330, respectively. The outputs of the NOR gates 328, 330, 332 and 334 are each connected to one input of an OR gate 338, the output of which is connected to one input of an AND gate 340. The outputs of the AND gates 326 and 336 are each fed to one input of an OR gate 342, the output of which is connected to one input of an NOR gate 344. The output of the AND gate 340 is connected to a second input of the NOR gate 344. The output of the NOR gate 344 is connected to one input of an AND gate 346. A clock signal is connected to a second input of the AND gate 346. This clock signal is supplied to each of the shift registers 300 to cause them to shift one pulse to the right. In addition, the clock signal output of the AND gate 346 is also connected to a flip-flop 360 which is connected to a second input of the AND gate 340 and which is enabled by an enable pulse from the control unit 222.

The sign outputs of the adders 302, 306 and the inverters 318 and 320 are each connected to similar circuits comprising a delay 348 and a NOR gate 350. These output signals are connected to the delay 348, the output of which is connected to one input of the NOR gate 350, and to the second input of the NOR gate 350. The outputs of the NOR gates 350 are each connected to one input of an OR gate 352 which enables a plurality of AND gates 354 to pass the sum output from the adders 302, 304, 306, and 308 into each of the starting point referenced coordinate registers. Identical delay line 348 and NOR gate 350 circuits are also connected to the sign outputs of the subtractors 312, and 316 and the inverters 322 and 324. The outputs of these circuits are connected to an OR gate 356 which enables a plurality of AND gates 358 to pass the sum outputs from the subtractors 310, 312, 314, and 316 to the end point referenced coordinate registers.

In operation, the circuit shown in FIG. 16*b* functions to consider the output code of the starting and end points of a line segment to determine whether either is within the subsquare being examined. The circuitry will indicate whether the points stored in the referenced coordinate registers are within the subsquare by an output from the AND gate 326 or the AND gate 336. Additionally, the output codes for the starting and end points are compared in the NOR gates 328 through 334 to determined whether the line segment cannot possibly be within the subsquare. These NOR gates essentially indicate whether or not the line is totally to the left, right, above or below the subsquare. A pulse output from either of the AND gates 326 and 336 and hence through the OR gate 342 indicates that the line segment is involved. A pulse output of any of the NOR gates 328, 330, 332 and 334 during the consideration of the starting and end points of the line segments indicates that the line segment is clearly outside of the subsquare. The consideration of the outputs of the NOR gates 328, 330, 332 and 334 is limited to the starting and end points by feeding any output pulses through the AND gate 340 which is only enabled during that consideration. If either of these conditions are true, then the next line segment will be accessed in by the control unit 222.

If, however, there is no output from the OR gate 342 or the AND gate 340, then the NOR gate 344 will enable AND gate 346 to pass a clock signal to shift each of the registers 300 to the right one digit. Such a shift is equivalent to dividing the displacement by a factor of two so that the output signs indicated from the adders 302–308 and the subtractors 310–316 will be representative of the midpoint of the line segment. The output codes of midpoints are then looked at by the AND gates 326 and 336 to determine whether the midpoint is within the subsquare. The output from the AND gate 340, which would indicate that the line segment is out, is disabled after the check of the starting and end points by the flip-flop 360 which sets the output connected to the AND gate 340 to zero when a clock pulse is fed through the AND gate 346. The flip-flop 360 is set upon receipt of a new line segment.

The delay line-NOR gate circuitry 350 compares the previous output sign to the present output sign to determine which half of the line segment may be discarded or, in fact, if both halves may be discarded thus indicating that the line segment is not within the subsquare. If an output pulse exists from any of the delay-NOR gate circuits associated with the OR gate 352, then the set of AND gates 354 will be enabled to replace the starting point in the referenced coordinate registers associated therewith with the midpoint value. If an output pulse exists on any of the delay-NOR gate circuits associated with the OR gate 356, then the set of AND gates 358 will be enabled to replace the end point in the referenced coordinate registers associated therewith with the midpoint value. This procedure essentially discards the half of the line segment outside of the subsquare and sets the registers to consider the other half.

If this first midpoint is not involved then the AND gate 346 will be enabled to pass another clock signal to shift the shift registers 300 another digit to the right. The circuit will then be set to consider the midpoint of the saved half of the line segment. This procedure is repeated by the circuit until either a midpoint is involved or the shift registers 300 contain zero. This zero state is sensed by the control unit 222 in a conventional manner to indicate that the line segment is not within the subsquare.

Completing the spatial relation calculator 224 is the circuit shown in FIG. 16c. If a polygon has not been determined to be involved by the circuit of FIG. 16b, then the control unit 222 sequentially feeds the starting and end points of each line segment to the crossing calculation section of the spatial relation calculator 224. The *y*-coordinates of the starting and end points, $y_i$ and $y_j$, are fed to a pair of subtractors 370 and 372. The *y*-coordinate of the corner being examined, $y_c$, is also fed to the subtracotrs 370 and 372.

The output signal of the subtractor 370 is fed to the one input of an AND gate 374 and through an inverter 376 to one input of an AND gate 378. The output signal of the subtractor 372 is fed to a second input of the AND gate 378 and through an inverter 380 to a second input of the AND gate 374. The output of the AND gate 374 is connected to one input of an AND gate 382 and one input of an OR gate 384. The output of the AND gate 378 is connected to a second input of the OR gate 384 and to one input of an AND gate 386. The output of the AND gate 382 is connected to decrement an up-down counter 388 and the output of the AND gate 386 is connected to increment the up-down counter 388.

The *x*-coordinates of the starting end points of the line segment $x_i$ and $x_j$ are also fed to a pair of subtractors 390 and 392. The *x*-coordinate of the corner being examined, $x_c$, is also supplied to the subtractors 390 and 392. The output of the subtractor 390 is connected to one input of an AND gate 394 and through an inverter 396 to one input of each of a pair of AND gates 398 and 400. The output of the subtractor 392 is connected to a second input of the AND gate 400 and through an inverter 399 to a second input of each of the AND gates 394 and 398.

The output of the AND gate 398 is connected to one input of an OR gate 402 the output of which is connected to a second input of the AND gate 382. The output of the AND gate 398 is also connected to one input of an OR gate 404, the output of which is connected to a second input of the AND gate 386. The output of the AND gates 394 and 400 are each connected to one input of an OR gate 406, the output of which is connected to an AND gate 408. The output of the OR gate 384 is connected to a second input of the AND gate 408.

The output of the AND gate 408 is connected to enable a set of gates 410 for passing the starting and end point coordinates as well as the corner coordinates through to a calculating section which calculates equation (8). The gates 410 are simply a plurality of AND gates connected to each of the coordinate output lines from the control unit 222 which are enabled to pass the coordinates through to the calculating section. Therefore, the gates 410 are not shown in detail.

The coordinates $x_c$, $x_j$, $y_c$ and $y_j$ are each fed through the gates 410 to one of a plurality of subtractors 412, 414, 416 and 418, respectively. The *x*-coordinate $x_i$ is also fed to subtractors 412, 414 and the *y*-coordinate $y_i$ is fed to the subtractors 416 and 418. The output of the subtractors 414 and 416 are multiplied in a multiplier 420 and the outputs of the subtractors 412 and 418 are multiplied in a multiplier 422. The output of the multiplier 420 is subtracted from the output of the multiplier 422 in a subtractor 424, the output of which is connected to a difference comparator 426.

The difference comparator 426 has three outputs 428, 430 and 432 which indicate whether the output signal from the subtractor 424 is less than zero, equal to zero, or greater than zero, respectively. The less than zero output 428 and the zero output 430 are each connected to an input of an OR gate 434, the output of which is connected to a second input of the OR gate 402. The greater than zero output 432 and the zero output 430 are each connected to an input of an OR gate 436, the output of which is connected to a second input of the OR gate 404.

In operation the crossing calculating section functions to determine the condition of the starting and end points of a line segment with respect to the coordinates of the subsquare corner.

As previously described, if the *y*-coordinates $y_i$ and $y_j$ are both above or below the *y*-coordinate of the corner $y_c$ then there can be no crossing. If, however, they are on opposite sides of $y_c$ then there may be a crossing, which will be negative if $y_i$ is above $y_c$ or positive if $y_j$ is above $y_c$, depending on the positions of the *x*-coordinates $x_i$ and $x_j$ relative to the *x*-coordinate of the subsquare corner $x_c$.

The subtractors 370 and 372; the inverters 376 and 380; and the AND gates 374 and 378 determine the positions of $y_i$ and $y_j$ relative to $y_c$. An output pulse from the AND gate 374 indicates that the $y_i$ and $y_j$ are on opposite sides of $y_c$ and that $y_i$ is above $y_c$. Therefore, this pulse enables the AND gate 382 to decrement the up-down counter 388 if the position of $x_i$ and $x_j$ relative to $x_c$ indicate a crossing. In the same manner the output of the AND gate 378, which indicates that $y_i$ and $y_j$ are on opposite sides of $y_c$ and $y_j$ is above $y_c$, enables the AND gate 386 to increment the up-down counter 388 if the positions of $x_i$ and $x_j$ relative to $x_c$ indicate a crossing.

With the ray extending in a decreasing negative X-direction as assumed in the previous description, if both $x_i$ and $x_j$ are less than $x_c$ then there is a crossing. To check for this the inverted outputs of the subtractors 390 and 392 are fed to the AND gate 398. If both are, in fact, less than $x_c$, then the output of the AND gate 398 through the OR gates 402 and 404 enables both the AND gates 382 and 386. Thus the up-down counter 388 will be incremented or decremented depending on the relative positions of $y_i$ and $y_j$.

If, however, $x_i$ and $x_j$ are on opposite sides of $x_c$ then the equation (8) must be calculated to determine whether a crossing occurs. Therefore, the output of the subtractor 390 is compared to an inverted output of the subtractor 392 in the AND gate 394 and the output of the subtractor 392 is compared to an inverted output of the subtractor 390 in the AND gate 400. If either of these conditions of the $x$-coordinates exists, then AND gate 408 is enabled to enable the gates 410 to pass the coordinate values through to the equation (8) calculating section. Since the calculation will be unnecessary if the condition of the $y$-coordinates indicated that no crossing occurs, the AND gate 408 must also be enabled by an output signal from the OR gate 384 indicating that a proper condition does exist.

The calculating section functions to determine the equation (8) by subtracting and multiplying the appropriate signals together. The result of this calculation which is represented by the output signal of subtractor 424 must be considered to determine if either a negative or positive crossing has occurred in accordance with the previous description. This determination is made by the difference comparator 426. If $y_i$ was above $y_c$, then the output signal of the equation (8) calculating section must be either less than or equal to zero to indicate a negative crossing. Therefore, the outputs 428 and 430 are fed through the OR gate 434 to the OR gate 402 to enable the AND gate 382, if the output of the equation (8) calculating section output is either less than or equal to zero.

Similarly, if $y_j$ was above $y_c$ then the output of the equation (8) calculating section must be either greater or equal to zero indicating a positive crossing. Therefore, the outputs 430 and 432 from the difference comparator are fed through an OR gate 436 and through the OR gate 404 to enable the AND gate 386 if the equation (8) calculating section output is either greater than or equal to zero.

The control unit 222 sequentially supplies the appropriate signals representative of the end points of the polygons in a chosen order around the polygon. Once all the line segments have been considered, the output of the up-down counter will then be looked at by the control unit to determine whether the polygon is enclosing or out. The control unit will then send a clear signal to the counter to prepare it for the next polygon.

The Subdivider

As described previously, the subdivider receives instructions from the display control 230 to cause it to go on to the next subsquare or to subdivide further as appropriate. The subdivider also informs the display control 230 if the resolution limit of the display has been reached and, therefore, that the nearest polygon with the pertinent subsquare information should be fed to the display list.

Figure 17:
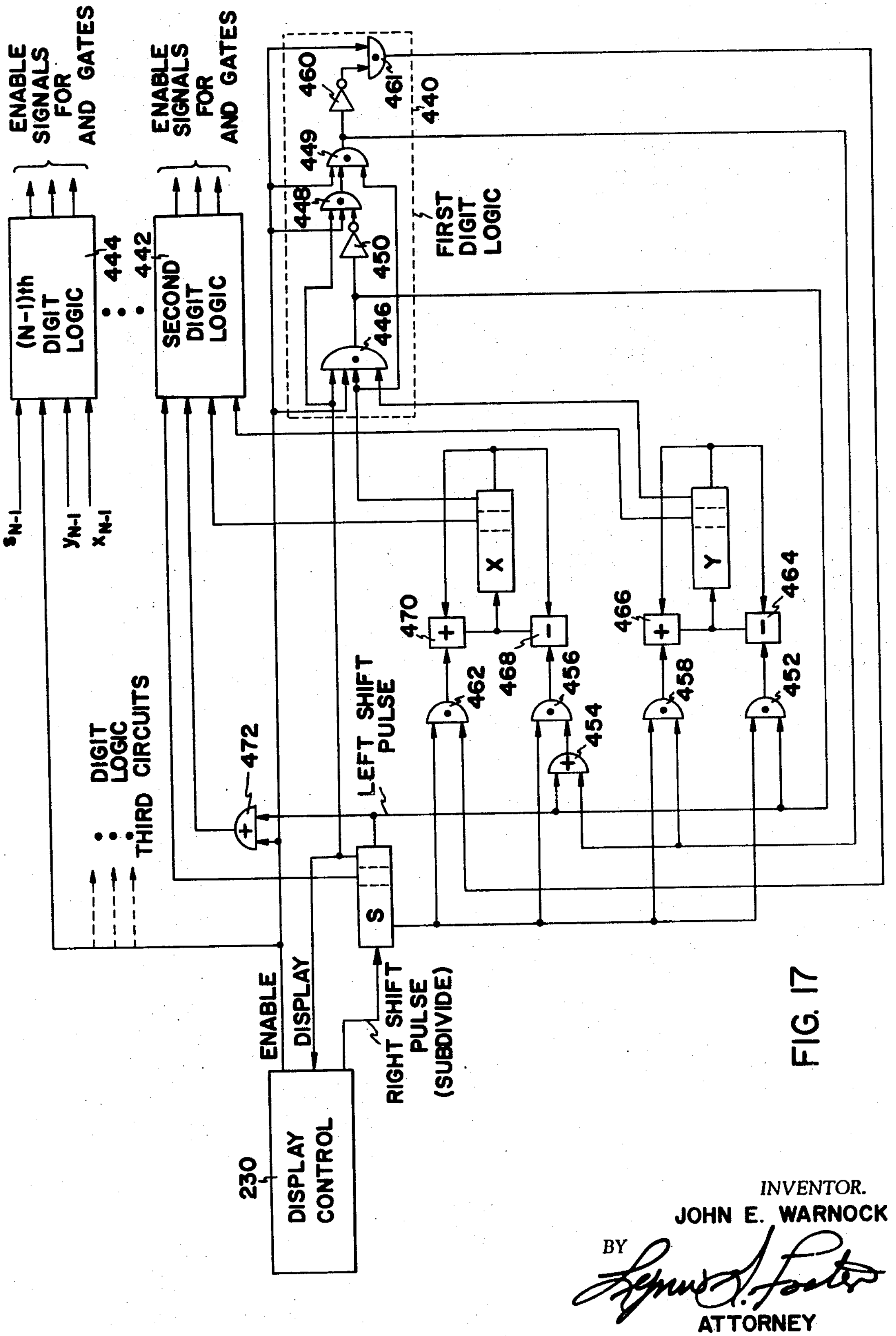
FIG. 17 is a schematic diagram of an embodiment of the subdivider.
Figure 18:
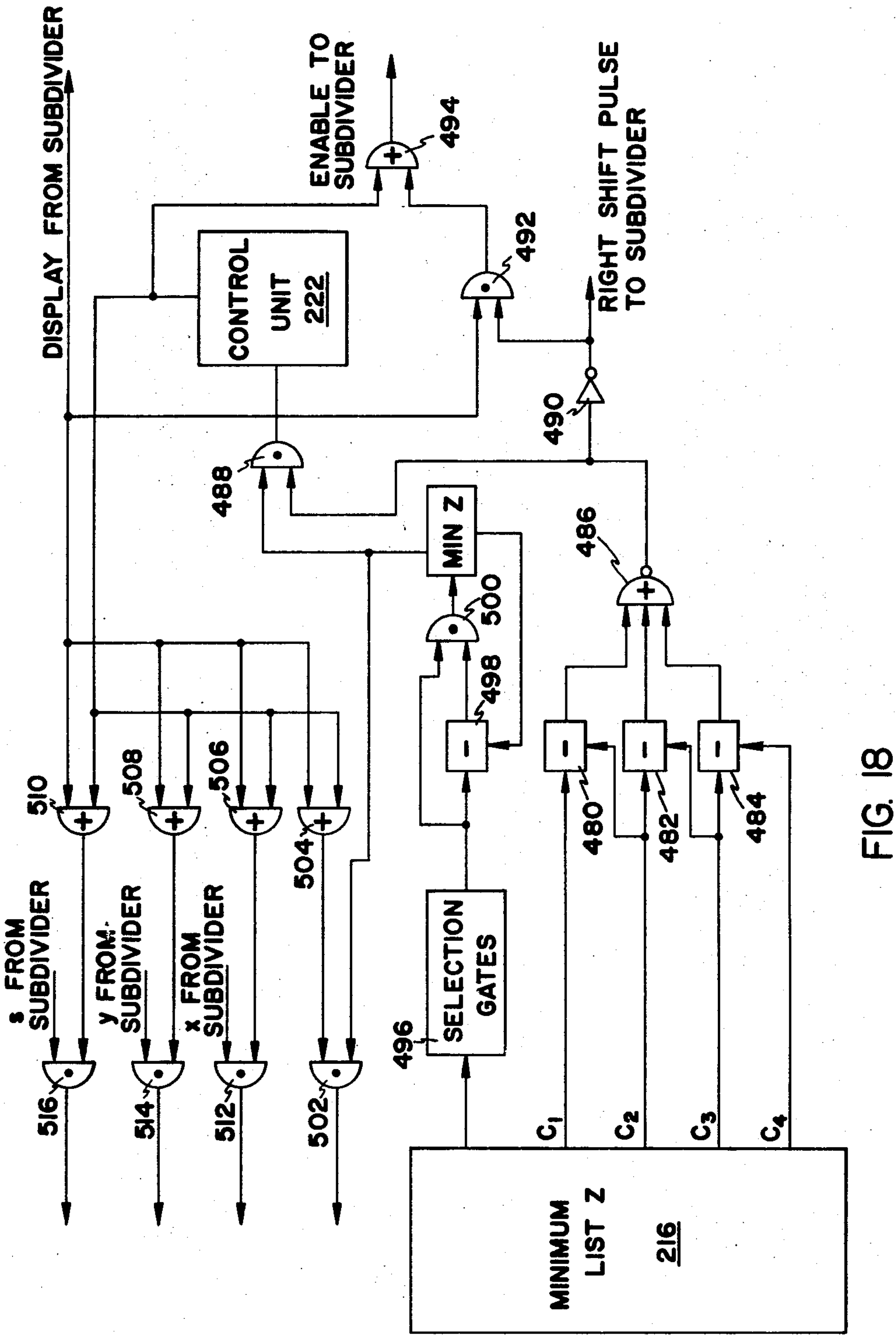
FIG. 18 is a schematic diagram of an embodiment of the display control.

Referring to FIG. 17, the subdivider includes an S register, which contains the value of S for the subsquare to be examined, and an X register and a Y register, which contain the coordinates of the lower left-hand corner of the subsquare. Each of the digits of the S, X and Y registers are supplied to a separate digit logic circuit to control the appropriate change in value of $x$, $y$ and/or $s$. In addition, digit logic circuits responsive to various combinations of the digits of X, Y, and S registers are also provided to handle the subdivision of subsquares whose lower left-hand corner coordinates are expressed by more than one digit. These digit logic circuits are indicated by a first digit logic 440, a second digit logic 442 and an $n-1$ digit logic 444. The $n$th digit need not be considered since it would represent the full view plane or view screen which must be subdivided at least once. The beginning S value is selected as being appropriate for the first subdivision of the viewing screen or view plane.

Only the first digit logic 440 is shown in detail. The remaining single digit and combination digit logics are similar to the first digit logic except that they are connected to different digits of the X, Y and S registers. Furthermore, combination digit logic circuits will necessarily include additional AND gates at their inputs to indicate that all the digits are present.

The first digit of the S, X and Y registers are fed to the first digit logic 440 and are each connected to an input of an AND gate 446. The first digit of the S register is also connected to an input of an AND gate 448. The output of the AND gate 446 is inverted in an inverter 450 and connected to a second input of the AND gate 448. The output of the AND gate 446 is also connected to one input of an AND gate 452, one input of an OR gate 454, and to a left shift pulse input of the S register. The output of the OR gate 454 is connected to one input of an AND gate 456.

The output of the AND gate 448 is connected to one input of an AND gate 449. The first digit of the X register is connected to a second input of the AND gate 449. The output of the AND gate 449 is connected to one input of an AND gate 458 and a second input of the OR gate 454. The output of the AND gate 449 is also inverted in an inverter 460 and is connected to one input of AND gate 461, the output of which is connected to the one input of an AND gate 462.

The output of the S register is connected to a second input of each of the AND gates 452, 456, 458 and 462. Thus, the signals from the outputs of the AND gates 446 and 448 selectively enable the AND gates 452, 456, 458 and 462 to pass the stored value of S therethrough. The outputs of the AND gates 452 and 458 are connected to a subtractor 464 and an adder 466, respectively, which are also connected to the output of the Y register. Similarly, the outputs of the AND gates 456 and 462 are connected to a subtractor 468 and an adder 470, which are also connected to the output of the X register.

The output of the AND gate 446 is also connected to one input of an OR gate 472, the output of which is connected to the second digit logic.

The first digit of the S register also supplies a display signal to the display control 230 indicating that the resolution limit of the display has been reached, and the display control 230 supplies an enable signal which is connected to one input of each of the AND gates in all of the digit logic circuits. Specifically with respect to the first digit logic circuit the enable signal from the display control 230 is connected to one input of each of the AND gates 446, 448, 449 and 461.

The enable signal is supplied to the second digit logic 442 through the OR gate 472. Similar OR gates will also be provided in all enable signal paths to the remaining digit logic circuits. In each case the output of the AND gate equivalent to AND gate 446 in the preceding digit logic circuit will be connected to one input of the OR gate equivalent to the OR gate 472.

In operation, the subdivider, upon instructions from the display control, functions to subdivide a subsquare and then to consider each of the "brother" subsquares thus formed sequentially. For example, if the display control indicates that no decision can be made on which polygon is to be displayed, it sends a right shift pulse signal to the S register thereby dividing the S-value by two. As each subdivision is finished with, whether it be by reaching the resolution limit or the display or because an enclosing polygon entirely occupies the subdivision and is in front of all other polygons, the display control sends an enable signal to all of the gates of all of the digit logic circuits.

For explanation assume that the right shift pulse has just been received, an enable signal is supplied to all the gates, the S-value after the shift is 1 in the first digit, and the first digits in the X and Y registers are zero. After the first subdivision is checked, an enable signal is supplied to the gates of the first digit logic. Since the first digits of the X and Y registers are zero, the output from the AND gate 446 is zero, which when inverted by the inverter 450, will enable the AND gate 448. The output of the AND gate 448 will enable the AND gate 449 to pass through a signal representative of the first X digit. Since the first X digit is zero, the output of the AND gate 449 will be zero which, when inverted by inverter 460 will pass through the enabled AND gate 461 to enable the AND gate 462 to add the value S to the X register through the adder 470. Therefore, the "brother" subsquare will be considered. On the next enabling signal, the value of the first X digit will be one, therefore the output of the AND gate 449 will be one. This will enable the AND agate 456 through the OR gate 454 to subtract S from the X register through the subtractor 468. In addition, the one output from the AND gate 449 will enable the AND gate 458 to add S to the Y register through the adder 466. Once this subsquare is considered, and an enabling signal is supplied, since the first $x$ digit is now zero, the value S will be added to the X register, as previously described.

When the consideration of this subsquare is completed, the first X and Y digits will be 1, and therefore the AND gate 446 will have a positive output upon reception of an enabling pulse which will cause the value S to be subtracted from both the X and Y registers, and will shift the S register one digit to the left thereby multiplying it by two. The subtraction of S from the X register has been described previously. The subtraction of S from the Y register is done through the enabled AND gate 452 and the subtractor 454. Since we have been considering the first digit of each of the registers, the resolution limit of the display has been reached and, therefore, upon consideration of each of the subsquares previously mentioned, the display control has received a display signal instructing it to display the nearest polygon. Upon returning to the "father" subsquare, as indicated by an output pulse from the AND gate 446, the second digit logic is enabled through the OR gate 472 to go to the "brother," of the "father." Each of the remaining digit logics operate in the same manner as the first digit logic circuit 442.

Display Control

As described previously, the display control considers the polygons nearest to each corner of a subsquare, determines whether the same polygon is nearest to each of the corners, and asks the control unit 222 whether or not that polygon is enclosing. If it is, then the display control 230 will list the pertinent subsquare information, and the polygon visible therein, in the DISPLAY LIST portion of the memory 216.

The polygon numbers are supplied to appropriate inputs of a plurality of subtractors 480, 482 and 484. More specifically, the polygon at one corner $c_1$ is supplied to one input of the subtractor 480; the polygon at a second corner corner $c_2$ is supplied to a second input of the subtractor 480 and one input of the subtractor 482; the polygon at a third corner $c_3$ is supplied to a second input of the subtractor 482 and to one input of the subtractor 484; and the polygon at a fourth corner $c_4$ is supplied to a second input of subtractor 484.

The outputs of each of the subtractors 480, 482 and 484 are supplied to a NOR gate 486, the output of which is connected to one input of an AND gate 488 and through an inverter 490 to one input of an AND gate 492. The output of the AND gate 492 is connected to an OR gate 494.

Also supplied from the MINIMUM LIST Z portion of the memory 216 are the polygons and the minimum $z$ value to a set of selection gates 496. Selection gates 496 sequentially supply each of the polygons and the minimum $z$ value to one input of a subtractor 498. The output of the subtractor is connected to one input of an AND gate 500, the output of which is connected to a minimum $z$ register. The value of $z$ stored in the minimum $z$ register is connected to a second input of the subtractor 498. The polygon number stored in the minimum $z$ register is supplied to a second input of the AND gate 488 and to one input of an AND gate 502. The output of the AND gate 488 is connected to the control unit 222.

An output on the AND gate 488 indicates that all the polygons are the same and, therefore, the control unit 222 is being asked if that polygon is enclosing. If the answer is yes, the control unit will provide an output pulse to one input of each of a plurality of OR gates 504, 506, 508 and 510. This output pulse is also supplied to a second input of the OR gate 494. The output of the OR gates 504 is connected to the AND gate 502 and the outputs of the OR gates 506, 508 and 510 are each connected to an input of one of a plurality of AND gates 512, 514 and 516, respectively. The display signal from the subdivider is connected to a second input of each of the OR gates 504, 506, 508 and 510, and to a second input of the AND gate 492.

Also, the X, Y and S values of the subsquare are supplied from the subdivider to a second input of the AND gates 512, 514 and 516, respectively.

In operation, the subtractors 480, 482 and 484 determine whether or not the same polygon is the minimum distance from each of the corners of the subsquare. If yes, then an output pulse is provided from the NOR gate 486 to enable the AND gate 488 to pass the polygon number from the minimum $z$ register to the control unit to check whether the polygon is enclosing. If not, then the absence of a pulse at NOR gate 486 will be inverted by the inverter 490 to supply a right shift pulse to the subdivider.

In addition, if the subdivider indicates that the resolution limit of the display has been reached, this right shift pulse will be fed through the AND gate 492 and through the OR gate 494 to enable the subdivider to go to the next subsquare. If the control unit indicates that the polygon is enclosing, the output pulse from the control unit 222 will, through the OR gates 504, 506, 508 and 510, enable the AND gates 502, 512, 514 and 516 to pass the polygon number and pertinent subsquare information to the DISPLAY LIST portion of the memory 216.

Alternatively, if the resolution limit of the display has been reached, the display signal from the subdivider will, through the OR gates 504, 506 and 510, enable the AND gates 502, 512, 514 and 516 to pass through the pertinent subsquare information and the nearest polygon as stored in the minimum $z$ register. The nearest polygon will be stored in the minimum $z$ register by virtue of the subtractor 498 and the AND gate 500. Subtractor 498 subtracts the next $z$-value from the presently stored one and if the output is positive enables the AND gate 500 to store the new value in the minimum $z$ register. In this manner, the minimum $z$ register will contain the nearest polygon, which will be the polygon to be displayed whether the resolution limit of the display has been reached or the same polygon is the minimum distance from each corner and the control unit 222 indicates that it is enclosing.

Alternatively the display control may be simplified somewhat by arbitrarily defining the nearest polygon as being that polygon, if any, that encloses the upper right-hand corner and is nearest in $z$-value at that point. If this arbitrary determination is utilized the selection gates 496, the subtractor 498, the AND gate 500 and the MIN Z register may be deleted. The polygon number input to the AND gates 502 and 488 would then be taken directly from the right-hand corner values stored in the MINIMUM LIST Z portion of the memory 216.

Thus, one embodiment for carrying out the novel method and system for the present invention has been disclosed. In addition, suitable circuits to carry out the various functions have been either disclosed in detail or known circuits have been referenced. Of course, other circuits for performing the same functions may be utilized. One such arrangement might include the microprocessor units disclosed in the second embodiment of the Romney et al. application cited above. Other suitable circuits will be apparent to those skilled in the art.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. A method for generating a perspective view display of a three-dimensional object on a two-dimensional display comprising:

providing input data defining surface of an object to be displayed;

converting said input data to represent projections of the surfaces of the objects on a two-dimensional view plane established according to the desired orientation of the objects;

progressively subdividing the area of said view plane into subdivisions;

determining the surfaces defined by the input data that are visible within each subdivision; and, displaying the surfaces determined to be visible in areas of the display corresponding to the subdivisions.

2. The method of claim 1 wherein the progressive subdivision of the area of the view plane comprises successively subdividing each previous subdivision of a predetermined number of times or until a subdivision is either devoid of surfaces or entirely occupied by a single visible surface.

3. The method of claim 2 and further comprising:

determining the spatial relationship between each surface and the particular subdivision being checked;

ordering the surfaces according to their spatial relationship within the subdivision; and checking the surfaces in the order established to determine whether the subdivision is devoid of any visible surfaces or entirely occupied by a single visible surface.

4. The method of claim 3 wherein the spatial relationships between each surface and each subdivision is determined by calculating the extent, if any, to which the surface occupies the subdivision, and wherein the ordering of the surfaces is determined in accordance with the calculated extents of occupation by the surfaces of the subdivision.

5. The method of claim 4 wherein the ordering of the surfaces established for a subdivision is retained intact by adjusting only the extents of occupation by the surfaces for successive subdivisions of that subdivision.

6. The method of clalm 1 wherein the object surfaces defined by the input data are planar polygons.

7. The method of claim 1 wherein the visibility of the surfaces defined by the input data is determined by calculating the distances of each surface from the view plane and comparing the calculated distances of the surfaces within each subdivision to determine which surface is closest to the view plane.

8. The method of claim 1 wherein the display is an electronic display, and wherein each visible surface is displayed by modifying the intensity of the display in accordance with a visual characteristic of that visible surface.

9. The method of claim 8 wherein the electronic display utilizes a raster scan display; and wherein the visual characteristic for each surface is determined by calculating an intensity of illumination from a light source at a predetermined position at the point at which the surface to be displayed enters a scan line and thereafter incrementally changing the intensity of illumination along the scan line for the remainder of the surface to be displayed along that scan line.

10. The method of claim 1 wherein the subdivisions of the area of said view plane are two-dimensional areas.

11. The method of claim 1 wherein the progressive subdivision of the view plane comprises:

subdividing the area of the view plane into four subsquares;

successively subdividing each of said subsquares into four smaller subsquares; and repeating the subdivision of the progressively smaller subsquares until the resolution limit of the display is reached or until a subsquare is either devoid of surfaces or entirely occupied by a single visible surface.

12. A method for generating a perspective view display of a three-dimensional object on a viewing screen of a two-dimensional display comprising:

providing input data defining surfaces of an object to be displayed;

progressively calculating the spatial relationship of each of said surfaces with subdivisions of the viewing screen of the display;

determining from the calculated spatial relationships which object surface defined by the input data is visible in a predetermined orientation of the object in each subdivision; and, modifying the intensity of the subdivisions of the viewing screen of the display in accordance with the object surface determined to be visible therein.

13. The method of claim 12 wherein the visible surface within each subdivision is determined by calculating the distances of each surface in the subdivision from the viewing screen of the display and selecting the surface closest to the view plane.

14. The method of claim 12 wherein the object surfaces defined by the input data are planar polygons.

15. The method of claim 12 wherein the intensity of the display is modified by determining a visual characteristic of the visible surface in each subdivision.

16. The method of claim 15 wherein the visual characteristic of each surface is determined by calculating the apparent illumination of the surface from a light source at a predetermined position.

17. The method of claim 16 wherein the display utilizes a raster scan; and wherein the calculated apparent illumination of each surface for modifying the intensity of the display is determined by calculating the apparent illumination of the surface at the point at which the surface to be displayed enters a scan line and thereafter incrementally varying the apparent illumination along the scan line.

18. The method of claim 12 wherein the subdivisions are established by first subdividing the viewing screen into a plurality of subdivisions and further subdividing each previous subdivision in the same manner until the resolution limit of the display is reached or until a subdivision is either devoid of surfaces or entirely occupied by a single visible surface.

19. The method of claim 18 wherein the visible surface within each subdivision is determined by ordering all of the surfaces for each subdivision according to their spatial relationship with that subdivision;

checking each surface in the order established to determine whether the subdivision is devoid of all surfaces or entirely occupied by a single visible surface;

identifying a view plane according to the predetermined orientation of the objects; and selecting the single visible surface entirely occupying the subdivision if it exists or the surface determined to be closest to the specified view plane if the resolution limit of the display has been reached.

20. The method of claim 19 wherein the spatial relationships of an object surface within a subdivision is determined by ascertaining the extent to which said surface occupies the subdivision; and wherein the ordering of the surfaces is in descending degree of occupation of a subdivision.

21. The method of claim 20 wherein the ordering of the surfaces is established for a subdivision and is saved and reused for successive subdivisions of that subdivision.

22. The method of claim 18 wherein the subdivisions of the viewing screen are two-dimensional areas.

23. A method for generating a perspective view of a three-dimensional object on a viewing screen of a two-dimensional display comprising:

supplying electric signals representative of data defining surfaces of an object to be displayed;

electronically calculating the spatial relationship of the surfaces defined by the electrical signals with respect to progressively smaller subdivisions of the viewing screen of the display;

generating electrical signals representing the spatial relationships determined, electronically calculating from the electrical signals representing the spatial relationships the surface which is to be displayed in each subdivision of the viewing screen of the display, and displaying in each subdivision of the viewing screen of the display the surface calculated to be displayed in that subdivision.

24. The method of claim 23 wherein the subdivisions of the viewing screen are areas in the plane of the viewing screen.

25. The method of claim 23 further comprising:

specifying an observation point from which the objects to be displayed are considered to be viewed, and wherein the surface defined by the electrical signals to be displayed in each subdivision of the viewing screen of the display is determined by selecting the surface closet to said specified observation point.

26. The method of claim 25 wherein the surfaces to be displayed in each subdivision are calculated by storing the electrical signals representative of the spatial relationships in a storage device;

ordering the stored electrical signals according to the extent to which the surfaces represented thereby occupy the subdivision;

calculating from the supplied electrical signals the distance each surface which occupies the subdivision to some extent is behind the subdivision;

comparing the calculated distances to determine which surface is closest to the subdivision; and displaying the surface determined to be closest to the subdivision.

27. The method of claim 23 wherein the display comprises an electronic raster scan display, and wherein the surface calculated to be displayed in each subdivision is displayed by modifying the intensity of the display in accordance with an electronically calculated apparent illumination of the surface from a predetermined light source at the point at which the surface enters each scan line and incrementally varying the intensity along the scan line until that surface exists therefrom.

28. The method of claim 23 wherein the surfaces defined by the electrical signals are planar polygons specified by electrical signals defining their vertex points.

29. The method of claim 23 wherein the display is an electronic display the intensity of which is modified in accordance with a visual characteristic of the surface to be displayed.

30. The method of claim 29 wherein the visual characteristic of each surface to be displayed is a calculated apparent illumination of that surface from a predetermined light source.

31. The method of claim 23 wherein each of the progressively smaller subdivisions of the viewing screen of the display is formed by first subdividing said viewing screen into a plurality of subdivisions and further subdividing each previous subdivision to a predetermined degree unless the calculated spatial relationships of the surfaces indicate that the subdivision is either devoid of any surfaces or entirely occupied by a single surface which is closest to that subdivision in the desired orientation of the object.

32. A method for generating perspective images of a three-dimensional object on a two-dimensional display comprising, providing input data defining surfaces of the object to be displayed, calculating the spatial relationship of each of said surfaces with respect to subdivisions of the screen of the display, ordering the input data defining the surfaces for each subdivision according to the calculated spatial relationship of the surfaces with respect to that subdivision, checking each surface in the order established to determine the surface visible in the desired orientation of the object in that subdivision, and displaying in each subdivision of the screen the surface determined to be visible in that subdivision.

33. The method of claim 32 wherein the subdivisions of the screen of the display are determined by successively subdividing previous subdivisions until the resolution limit of the display is reached or until a subdivision is either devoid of all surfaces or entirely occupied by a single visible surface.

34. The method of claim 33 wherein the order established for the surfaces for previous subdivisions is retained in the checking performed for subdivisions thereof.

35. The method of claim 34 wherein the visible surface within each subdivision is determined by calculating the distance behind the subdivision of each surface which occupies that subdivision to some extent, comparing the calculated distances to determine which surface is closest to the subdivision, and selecting as the visible surface the surface closest to the subdivision.

36. The method of claim 35 wherein the surfaces defined by the input data are planar polygons specified by their vertex points.

37. The method of claim 36 wherein the subdivisions of the screen are two-dimensional areas of the screen.

38. A system for generating a perspective image of a three-dimensional object comprising:

input means for providing input data representative of the surfaces of an object;

a first calculating means connected to said input means for determining the spatial relationships between said surfaces defined by said input data and calculated subdivisions of an image plane on which the perspective image is formed;

a second calculating means connected to said first calculating means for determining the surfaces to be displayed in said calculated subdivisions; and display means connected to said second calculating means for displaying the surfaces determined to be displayed by said second calculating means in areas corresponding to said calculated subdivisions.

39. The system as defined in claim 38 and further comprising:

subdivider means connected to said first calculating means for calculating the required subdivisions of said image plane in response to said spatial relationships determined by said first calculating means.

40. The system as defined in claim 39 wherein said subdivider means calculates progressively smaller subdivisions in response to said spatial relationships determined by said first calculating means.

41. The system as defined in claim 39 wherein the spatial relationships determined by said first calculating means is the extent, if any, of the occupation of said subdivisions by said surfaces.

42. The system as defined in claim 41 wherein said subdivider means calculates said progressively smaller subdivisions by subdividing previously calculated subdivisions.

43. The system as defined in claim 42 and further comprising:

a storage means for storing said spatial relationships; and a control means connected between said storage means and said first calculating means for controlling the operation of said first calculating means in determining the spatial relationships of newly calculated subdivisions in accordance with the spatial relationships determined for said previously calculated subdivisions which were subdivided by said subdivider means to form said newly calculated subdivisions.

44. The system as defined in claim 43 wherein said surfaces represented by said input data re planar polygons.

45. In a method of electrically producing at a display a two-dimensional perspective image of a three-dimensional object:

defining the object in data representing the three-space location of surfaces of the object;

converting three-space data into data descriptive of the location of surfaces of a two-space perspective representation;

relating the two-space data to two-space coordinates of subdivisions of the display;

determining which surfaces of the two-space object are visible within selected subdivisions of the display; and utilizing the two-space data having to do with the visible surface to create the two-dimensional perspective image at the display.

46. Apparatus for electrically producing on a display a two-dimensional perspective image of a multisurface three-dimensional object, the improvements comprising:

means for providing data representing two-dimensional coordinates of subdivisions of the display;

a visible surface calculator comprising means spatially relating data representing two-dimensional coordinates of surfaces of the objects to two-dimensional coordinates defining subdivisions of the display; and means segregating the display-related surface coordinate data having to do with visible surfaces from the corresponding data having to do with surfaces which are not visible.

47. An electronic system for generating a perspective image of a three-dimensional object on a two-dimensional display comprising:

input means for supplying electrical signals representative of the surfaces of an object;

a transformation calculating means connected to said input means for converting said electrical signals to represent the projections of said surfaces on a two-dimensional view plane;

a subdivider means for calculating subdivisions of said view plane;

a spatial relation calculating means connected between said transformation calculating means and said subdivider means for determining the spatial relationship of each of said projected surfaces defined by said converted electrical signals with respect to said calculated subdivisions;

control means connected to said spatial relation calculating means and said subdivider means for determining which of said projected surfaces defined by said converted electrical signals would be visible within each of said calculated subdivisions in the desired orienation of the object; and a two-dimensional display means connected to said control means for displaying said visible surfaces in areas of the display screen corresponding to the calculated subdivision in which said surfaces are visible, said display means receiving electrical signals from said control means representative of the visible surfaces and the calculated subdivisions in which said surfaces are determined to be visible.

48. The electronic system as defined in claim 47 wherein said subdivider means calculates progressively smaller subdivisions by subdividing previously caLculated subdivisions; and wherein said control means controls the operation of said spatial relation calculating means for newly calculated subdivisions responsive to the spatial relationships determined for said previously calculated subdivisions.

49. The electronic systems as defined in claim 48 wherein said surfaces represented by the electrical signals are planar polygons specified by electrical signals representing the vertex points of said polygons.

50. A method for generating a perspective image of an object on a display comprising:

providing input data representative of the surfaces of an object;

calculating the spatial relationships of said surfaces with spatial subdivisions in relation to said object;

determining from said spatial relationships the surfaces to be displayed; and displaying said surfaces on a display.

51. A method for generating a perspective image of an object on a display comprising:

providing input data representative of the surfaces of an object;

calculating the spatial relationships of said surfaces with spatial subdivisions selected in accordance with said object;

determining from said spatial relationships the surfaces to be displayed; and displaying said surfaces on a display.